(12) United States Patent
Unite et al.

(10) Patent No.: US 7,533,033 B1
(45) Date of Patent: May 12, 2009

(54) BUILD AND OPERATE PROGRAM PROCESS FRAMEWORK AND EXECUTION

(75) Inventors: John Selby Unite, Mosman (AU); Ian Morris, Curl Curl (AU); Desmond Francis Arthur Bright, Wahroonga (AU); John William Milford, Sorrento (AU); Eva Prpic, Chatswood (AU)

(73) Assignee: International Business Machines Corporation, Armonk, NY (US)

( * ) Notice: Subject to any disclaimer, the term of this patent is extended or adjusted under 35 U.S.C. 154(b) by 2069 days.

(21) Appl. No.: 09/657,497

(22) Filed: Sep. 8, 2000

(51) Int. Cl.
*G06F 17/50* (2006.01)

(52) U.S. Cl. ............ 705/7; 705/8; 705/9; 705/10

(58) Field of Classification Search ......... 705/7, 705/8, 9, 10
See application file for complete search history.

(56) References Cited

U.S. PATENT DOCUMENTS

| | | | | |
|---|---|---|---|---|
| 5,867,824 | A * | 2/1999 | Saito et al. | 705/9 |
| 5,890,130 | A * | 3/1999 | Cox et al. | 705/7 |
| 6,009,406 | A * | 12/1999 | Nick | 705/10 |
| 6,032,124 | A * | 2/2000 | Saito et al. | 705/9 |
| 6,073,109 | A * | 6/2000 | Flores et al. | 705/8 |
| 6,073,110 | A * | 6/2000 | Rhodes et al. | 705/8 |
| 6,278,977 | B1 * | 8/2001 | Agrawal et al. | 705/7 |
| 6,289,348 | B1 * | 9/2001 | Richard et al. | 707/10 |
| 6,321,133 | B1 * | 11/2001 | Smirnov et al. | 700/100 |
| 6,381,610 | B1 * | 4/2002 | Gundewar et al. | 707/104.1 |
| 6,574,605 | B1 * | 6/2003 | Sanders et al. | 705/8 |
| 6,581,039 | B2 * | 6/2003 | Marpe et al. | 705/7 |

OTHER PUBLICATIONS

"Marketing, business processes, and shareholder value: An organizationally embedded view of marketing activities and the discipline of marketing", Srivastava, Rajendra K. et al., 1999, Journal of Marketing, v63, pp. 168-179, dialog file 15, Acc. 01951119.*
A Guide to the Project Management Body of Knowledge (PMBoK), 1996, Project Management Institute, Four Campus Boulevard, Newtown Square, Pensylvania 19073-3299, USA.
M.Paulk, W.Curtis, M.Chrissis and C.Weber, "Capability Maturity Model, Version 1.1", IEEE Software, vol. 10, No. 4, Jul. 1993, pp. 18-27.
Capability Maturity Model for Software (Version 1.1), Technical Report CMU/SEI-93-TR-024, M. Paulk, W. Curtis, M. Chrissis and C. Weber, Feb. 1993, Software Engineering Institute (SEI), Carnegie Mellon University, Pittsburgh, USA.
"Introduction to the Project Management System", W3 Worldwide Project Management Method 1.3.1 web site.
"About the Introduction and Concepts", W3 Worldwide Project Management Method 1.3.1 web site.
"The Scope of WWPMM", W3 Worldwide Project Management Method 1.3.1 web site.

* cited by examiner

*Primary Examiner*—Robert W Morgan
(74) *Attorney, Agent, or Firm*—William Steinberg; Anthony VS England

(57) ABSTRACT

Frameworks and methods for executing large-scale build and operate programs, such as sporting events, and particularly an Olympic Games. A framework of interlinked build, operate, and management processes is formed in accordance with the program requirements, which are specified in terms of deliverable products or service levels. Links between individual processes can only be traversed when exit criteria are satisfied. Methodologies are described that can be used to determine the exit criteria. Once a framework is established, a schedule control plan, by way of significant milestones, is determined. The milestones are chosen to correspond with links between processes that span process streams or project teams.

16 Claims, 23 Drawing Sheets

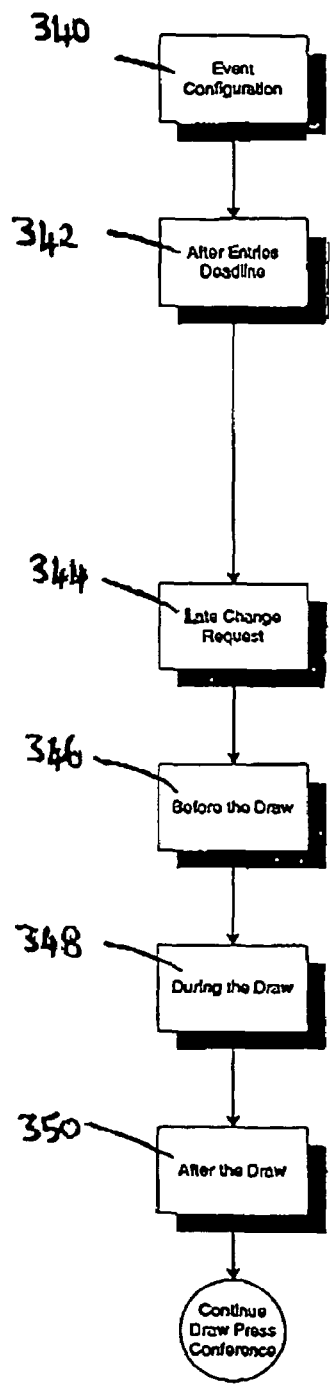
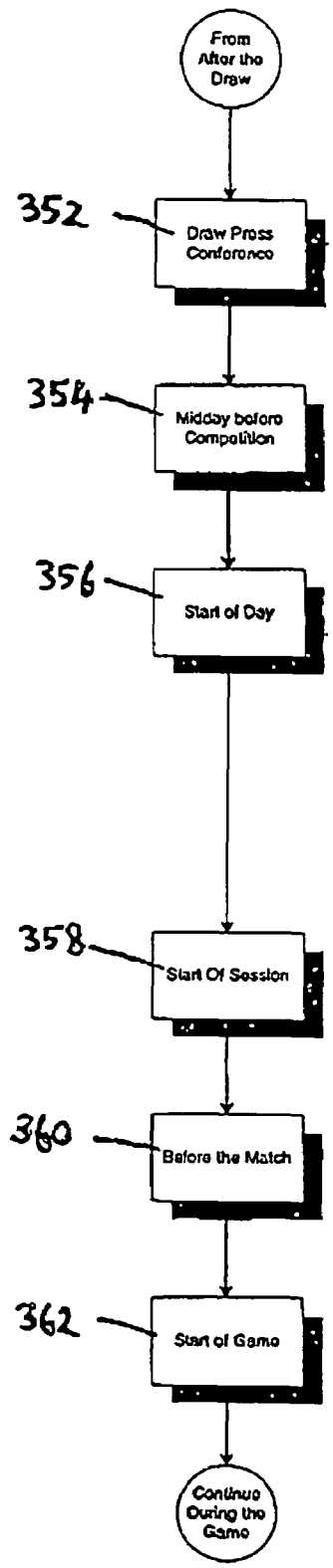
Fig. 12B
Fig. 12C

Badminton - ILD

BUILD AND OPERATE PROGRAM PROCESS FRAMEWORK AND EXECUTION

FIELD OF THE INVENTION

This invention relates to build and operate programs, and particularly, to a process framework for such programs and their execution.

BACKGROUND OF THE INVENTION

A program is marked by its size and complexity. It may conveniently be understood as a group of related projects which are managed in a coordinated way to achieve a long-term build and operate objective.

To illustrate this important aspect, it is useful to consider what is commonly known as "the Space Program". One such current program is that to build and operate the International Space Station in Earth orbit. The program is of enormous complexity, and includes, for example, building and delivering component modules of the space station, delivering the modules to the site in space, assembling the modules, and training astronauts in the operation and maintenance of the finally assembled space station. The build and operate program aspects are distributed over many geographical sites in different countries of the world, and in space.

Another example of a program, from the commercial arena, is the creation of a global e-business providing an entirely new service, or a large corporation moving to a new business model to deliver its existing products and services to the global market using the internet and e-commerce.

A further example of a program is providing technology for a large-scale sporting event, such as the Olympic Games. The program involves building and operating the Olympic Games technology across multiple venues, each staging multiple events over multiple days. Component projects can, for example, relate to building and operating information technology infrastructure, computer application systems, and telecommunications systems, the training and deploying of staff, and defining the processes for the collection and dissemination of results information to the media for the duration of the sporting events.

A characteristic shared by many technology programs is the need to "fast track" the build and operate phases in order to collapse time. Fast-tracking involves the overlapping of design and development activities, and the deployment and operation of some program components while others are still in the build phase. Fast-tracking increases the complexity of a program and increases the risk of cost and schedule overruns.

A build and operate technology program incorporates a number of management disciplines, each with their own specialist methodologies or process frameworks. Three of the key disciplines are project management, technology management and process management, for each of which a number of mature and widely accepted methodologies are known. However, individually, these methodologies either do not adequately address the complexity encountered in large-scale technology programs, or they do not deal with both the build and operate phases. Mature and accepted methodologies for large technology programs do not exist, and the integration of discipline-based methodologies is difficult because of conflicts in the application of core management principles or terminology.

An example of project management methodology is the Project Management Body of Knowledge (PMBoK) published by the Project Management Institute of Four Campus Boulevard, Newtown Square, Pa. 19073-3299, a worldwide certification body that certifies practitioners in project management competency.

Another example of prior art in technology management are the System Development Life Cycle (SDLC) Methodologies, produced by international IT consultancies, such as Information Engineering, Method1, Navigator and WSDDM, that focus on the build phase of Information Technology projects.

An example of a process methodology is the Capability Maturity Model (CMM) from the Software Engineering Institute (SEI) at Carnegie Mellon University in Pittsburg, USA. SEI act as a worldwide certification body in the software engineering competency. The focus of CMM is the build phase of software engineering projects.

Large build and operate technology programs that are undertaken without an adequate methodology or process framework are susceptible to failure for a number of reasons, the more common of which are:

Cost and schedule overruns because of an inability to define the scope of work and contractual obligations of each sub-contractor or project team in a way which supports a fast-track approach and changing organization structures during the transition from build to operate phases.

Cost and schedule overruns because of inadequate Cost/Schedule Control Systems ($CS^2$) and related processes such as deliverables management and change management.

Conflicts between the discipline-based methodologies of sub-contractors, when the program management methodology does not provide adequate integrating mechanisms.

An inability to perform total risk management (risk assessment, apportionment to sub-contractors, risk mitigation and contingency management).

Missing deployment schedule dates because of difficulties coordinating the delivery and integration of components from sub-contractors.

Missing deployment schedule dates because operational process development, staffing and logistics support schedules are not integrated with technology build activities.

Disputes relating to the quality of deliverables by sub-contractors, particularly in relation to services, because of inadequate methods for defining, negotiating and reporting on service levels.

Difficulty in managing the huge number of tasks/activities.

Failure to recognise the changes in skill required from building to operating.

It is the object of the present invention to avoid or at least reduce the disadvantages in prior art and to provide a framework suited to build and operate programs.

SUMMARY OF THE INVENTION

The invention discloses a framework for a build and operate program, comprising:

one or more build processes;

one or more operate processes;

one or more management processes; and a plurality of links formed as outputs from said build, operate and management processes that form inputs to one or more other build, operate or management processes;

and wherein a said link has associated with it exit conditions that must be satisfied before the link can be traversed from output to input.

The invention further provides a framework for a large-scale sporting event, comprising:
- a set of build processes generally followed by a set of testing processes, generally followed by a set of operations processes, generally followed by a set of game-day processes;
- a set of management processes related to all of said build, testing, operations, and game-day sets of processes;
- a plurality of links formed as outputs from individual build, test, operate, game-day, and management processes that form inputs to one or more other build, test, operate, game-day, and management processes; and
- wherein said link has associated with it exit conditions that must be satisfied before the link can be traversed from output to input.

The invention further provides a method for establishing a build and operate program, comprising the steps of:
- defining one or more build processes;
- defining one or more operate processes;
- defining one or more management processes;
- forming a plurality of links as outputs from said build, operate, and management processes and inputs to one or more other build, operate, or management processes.

The invention further discloses a method for executing a build and operate program, comprising the steps of:
- defining one or more build processes;
- defining one or more operate processes;
- defining one or more management processes;
- forming a plurality of links as outputs from said build, operate, and management processes and inputs to one or more other build, operate, or management processes; and
- allowing a link to be traversed from output to input in the course of executing the program only if exit conditions associated with it are satisfied.

The build processes can precede the operate processes, with an overlapping boundary therebetween such that some operate processes are able to be executed before all build processes are executed. Sequentially linked build and operate processes are assigned to one of a plurality of prescribed process streams, and links spanning across two or more process streams form planning milestones so far as the outputs represented by the link are concerned. In one form, each management process is linked only to either a build process or an operate process. The exit conditions can represent deliverable products or services that have been agreed to be provided.

The exit conditions can be determined by the steps of: beginning with an ultimate operate process, determining what requirements should be met to perform that process defining exit criteria for immediately preceding processes and continuing to progressively determine requirements for preceding processes to determine exit criteria for each said process.

The invention yet further provides a method for executing a large-scale sporting event, comprising the steps of:
- defining a set of build processes generally followed by a set of testing processes, generally followed by a set of operations processes, generally followed by a set of game-day processes;
- defining a set of management processes related to all of said build, testing, operations, and game-day processes;
- forming a plurality of links as outputs from individual build, test, operate, game-day, and management processes; and
- allowing a link to be traversed from output to input in the course of executing the program only if exit conditions associated with it are satisfied.

The invention yet further provides a method for executing a build and operate program, comprising the steps of:
- determining program requirements;
- defining build, operate, and management processes, and related links therebetween, based on said requirements, said links between processes only being traversable if exit conditions associated with each are satisfied; and
- traversing said processes over time.

The invention yet further provides a method for executing a build and operate program comprising the steps of:
- determining program requirements;
- defining build, operate, and management processes, and related links therebetween, based on said requirements;
- beginning with an ultimate operate process, considering what requirements should be met to perform that process defining exit criteria for immediately preceding processes and continuing to progressively determine requirements for preceding processes to determine exit criteria for each said process, said exit criteria required to be satisfied before a link between processes can be traversed; and
- traversing said processes over time.

The invention yet further provides a method for executing a build and operate program, comprising the steps of:
- beginning with an ultimate operate process, determining what requirement should be met to perform that process, defining exit criteria for immediately preceding processes, and continuing to progressively determine requirements for preceding processes to determine exit conditions for each said process, said exit criteria required to be satisfied before a link between processes can be traversed.

BRIEF DESCRIPTION OF THE DRAWINGS

A number of embodiments of the invention will now be described with reference to the accompanying drawings, in which:

FIGS. 12A through 12E show a Process Level Definition (PLD) diagram for the sport Badminton;

DETAILED DESCRIPTION INCLUDING BEST MODE

Program Framework

Figure 1:
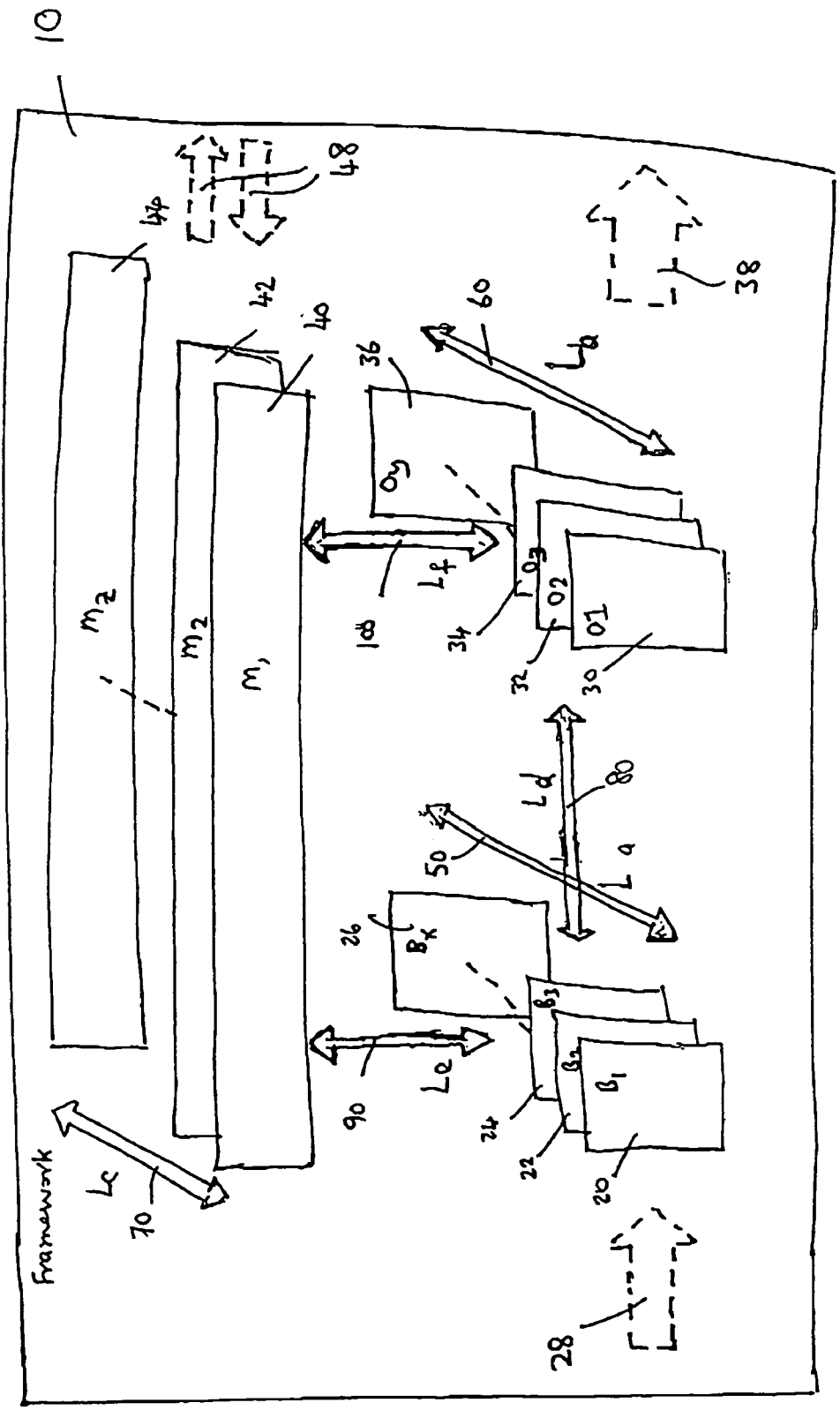
FIG. 1 is a schematic block diagram of a generalised build and operate program framework in accordance with the invention.

FIG. 1 shows a generalized build and operate program framework 10 that can be applied to a program having any purpose. The framework 10 includes a plurality of build processes, $B_1, B_2, B_3, \ldots, B_x$, 20-26. Further, there are a plurality of operate processes, $O_1, O_2, O_3, \ldots, O_y$, 30-36. Finally, there are a plurality of management processes, $M_1, M_2, \ldots M_z$, 40-44. The framework 10 thus is required to have the three basic types of processes: build, operate, and management.

Each of the individual build, operate, and management processes can have relationships with one or more other processes of the same type, or of the other two types. These relationships are referred to as "links". A link forms the output from one process and the input to one or more other processes. It is thus a 1-to-n mapping between output and inputs. Links are "traversed" from output to input.

In FIG. 1, the multiple links, $L_a$, are indicated by the broad line 50. The multiple links, $L_b$ between the operate processes 30-36 are indicated by the broad line 60. The multiple links, $L_c$, between the management processes 40-44 are indicated by the broad line 70. As noted above, links also are formed between processes of different types, and the links, $L_d$, between the build processes 20-26 and the operate processes 30-36 are indicated by the broad line 80. In a similar way, the links $L_e$, between the build processes 20-26 and the management processes 40-44 are indicated by the broad link 90. Finally, the links, $L_f$, between the operate processes 30-36 and the management process 40-44 are indicated by the broad line 100.

Whilst all of the multiple links within processes of the same type and between processes of the different type 50, 60, 70, 80, 90, 100 are indicated as being bi-directional (for the sake of illustration), it is to be appreciated that a link is only uni-directional, having a single output from a process and having an input to another process. Where the output from one process serves as an input to (for example) two processes, then it is to be thought of as constituting two links.

In addition to links formed between the basic classes of build, operate and management processes, there also can be 'external' links (ie. to external stakeholders) formed. FIG. 1 also shows such links 28, 38, 48 providing inputs and outputs, to the build processes, $B_x$, operate processes, $O_x$, and management processes, $M_x$, respectively.

The framework 10 shown in FIG. 1 is generalized, and must be specifically configured in consideration of the specific program at hand. This will be described further below.

Figure 2:
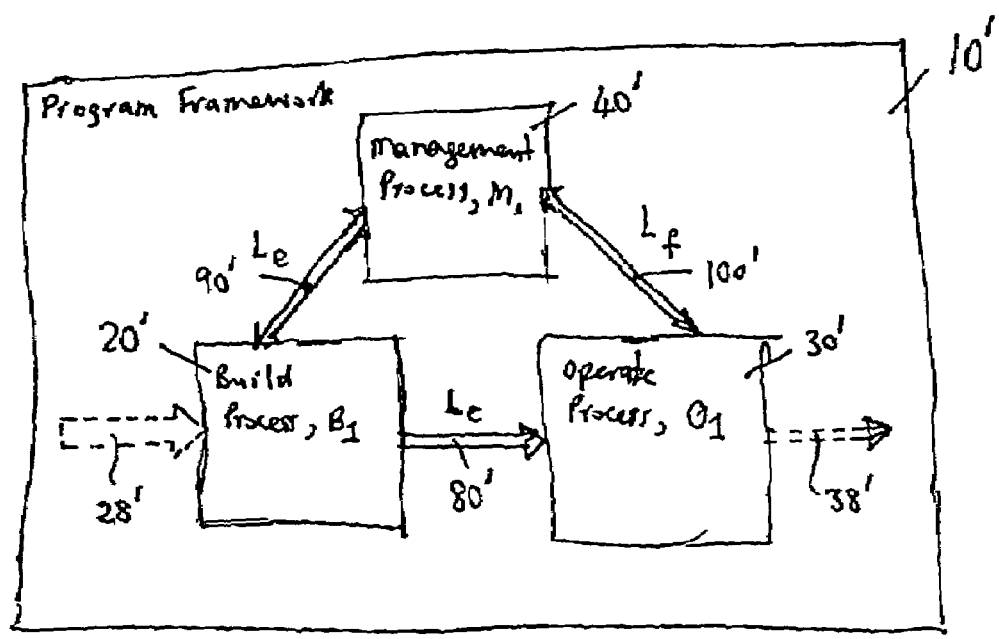
FIG. 2 is a schematic block diagram of the 'minimum set' program framework.

FIG. 2 shows a minimum set framework 10' where there is a single build process, $B_1$, 20' having input links 28', links, $L_c$, 80' with a single operate process, $O_1$, 30'. The operate process has a single external output link 38'. A single management process, $M_1$, 40' has links, $L_e$, 90' with the build process 20', and links, $L_f$, 100' with the operate process 30'.

Figure 3:
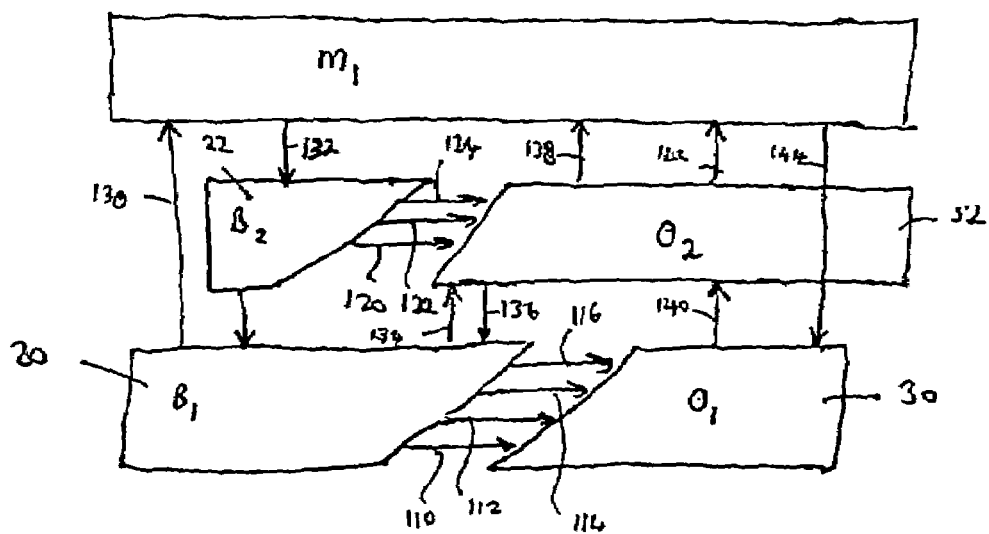
FIG. 3 is a schematic block diagram showing detail of staged interaction between build and operate phases.

FIG. 3 shows two build processes 20-22 having links principally with respective operate processes 30, 32. The first build process, $B_1$, 20 has four links 110-116 with the operate process, $O_1$, 30. FIG. 3 indicates that these links 110-116 are traversed at relatively different times, in what can be considered as a staged manner. In other words, the four links 110-116 that must be traversed to move from the build process 20 to the operate process 30 tend to occur at sequential points in time.

In a similar way, the second build process, $B_2$, 22 has three links 120-124 with the second operate process, $O_2$, 32. These links 120-124 also are traversed in sequence so the transition between build and operate is made in that manner.

Other links 140-144 have been shown relating to other aspects of the process interaction, and their relation in time, given that FIG. 3 broadly indicates the passage of time in a left-to-right direction.

Figure 4:
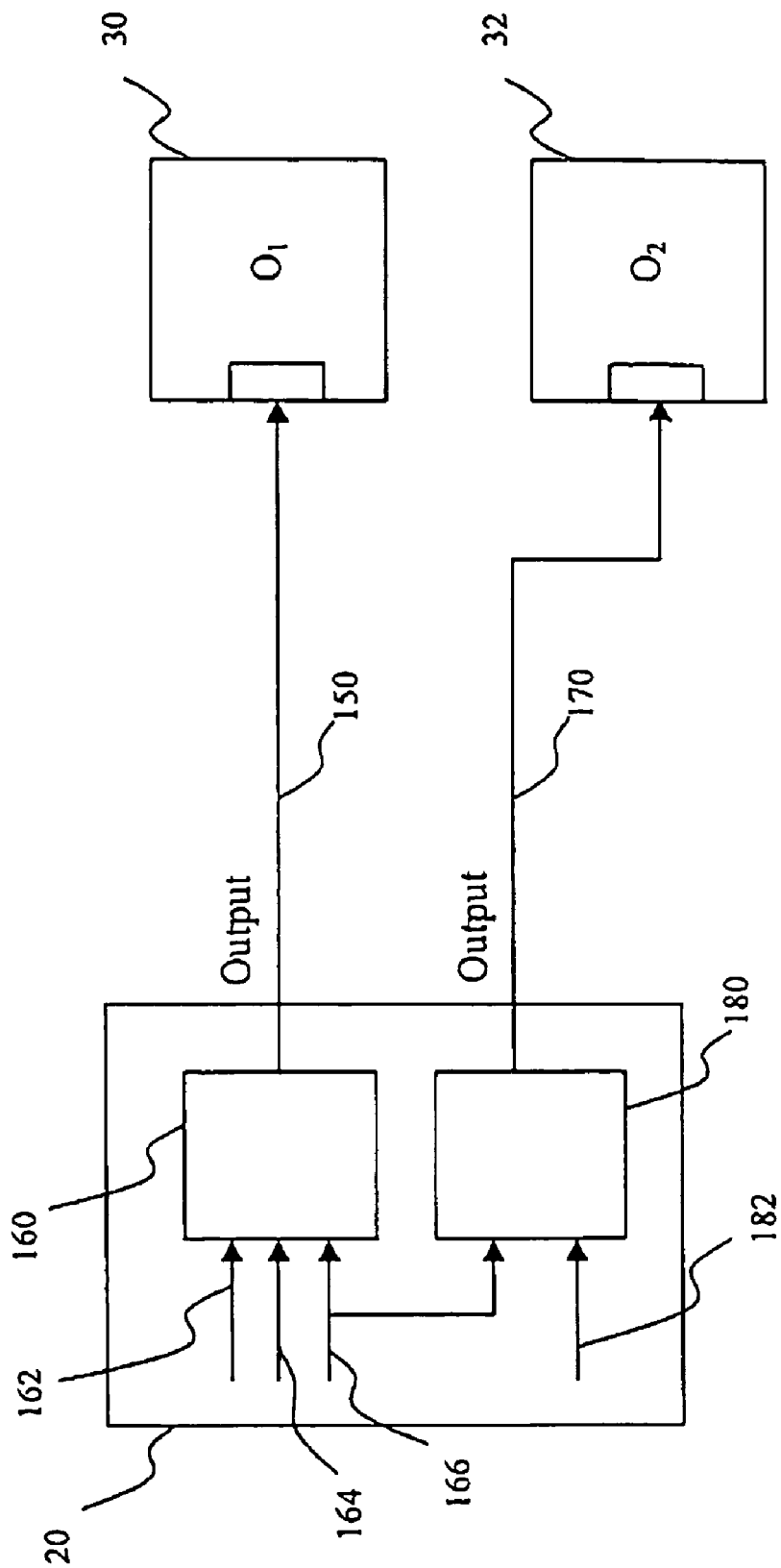
FIG. 4 is a schematic block diagram showing link inputs and outputs in more detail.

FIG. 4 is a schematic block diagram showing further details of a build process, $B_1$, 20 having links with two operate processes, $O_1$ and $O_2$, 30-32. This simplified view indicates that the link identified by the number 150 forms an output to build process 20 and an input to operate process 30. At the output of the build process 20 there is a logic block 160 that performs a test to determine whether three exit conditions 162-166 have been satisfied. The link 150 between the build process 20 and the operate process 30 can only be traversed if all three exit conditions have been satisfied. In a similar way, the link 170 from the build process 20 to the second operate process 32 can only be traversed if the logic block 180 assesses that the two indicated conditions 166 and 182 are satisfied.

It is convenient to think of "exit conditions" as being (i) "acceptance criteria", where deliverables/products are concerned, and (ii) "service level agreements", where services/tasks are concerned. This will be explained more fully below.

Establishing and Performing a Program

Figure 5A:
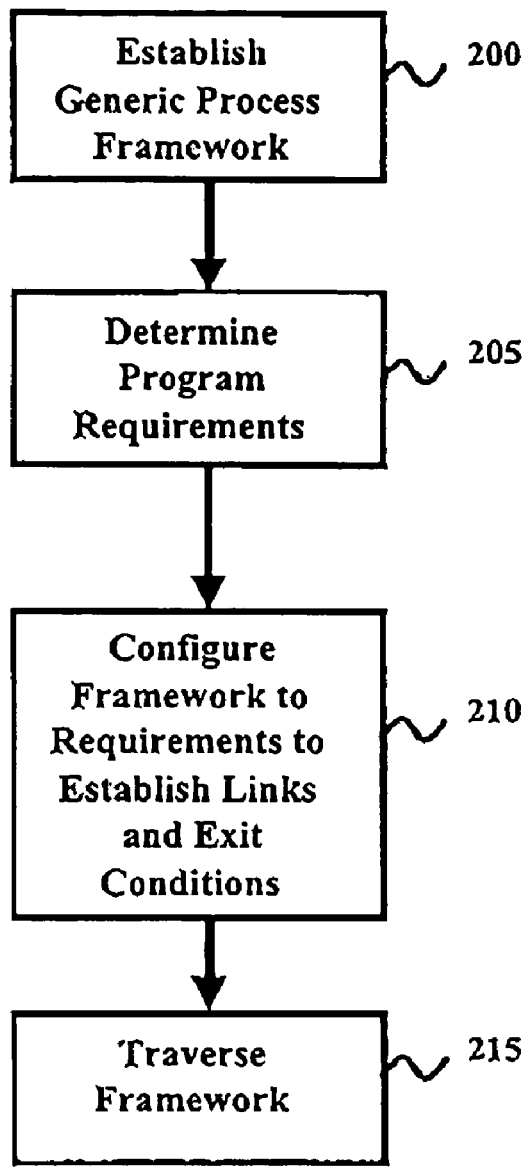
FIGS. 5A and 5B shows two flow diagrams relating to program framework definition and execution.

FIG. 5A is a flow diagram illustrating the basic methodology for performing a build and operate program.

A generic program framework is established in step 200, having build, operate, and management processes, as described above with reference to FIG. 1. In the following step (step 205), the program requirements are determined, in terms of all specified or necessary inputs and outputs. In step 210, the framework is then configured to meet the requirements by establishing links between processes and exit conditions that apply to each link. Once so configured, the framework is then traversed, in step 215, in the sense that with time process exit conditions are satisfied and a link may validly be traversed. Thus the program framework can be considered as spreading, generally, from build through to operate as links are able to be traversed.

Figure 5B:
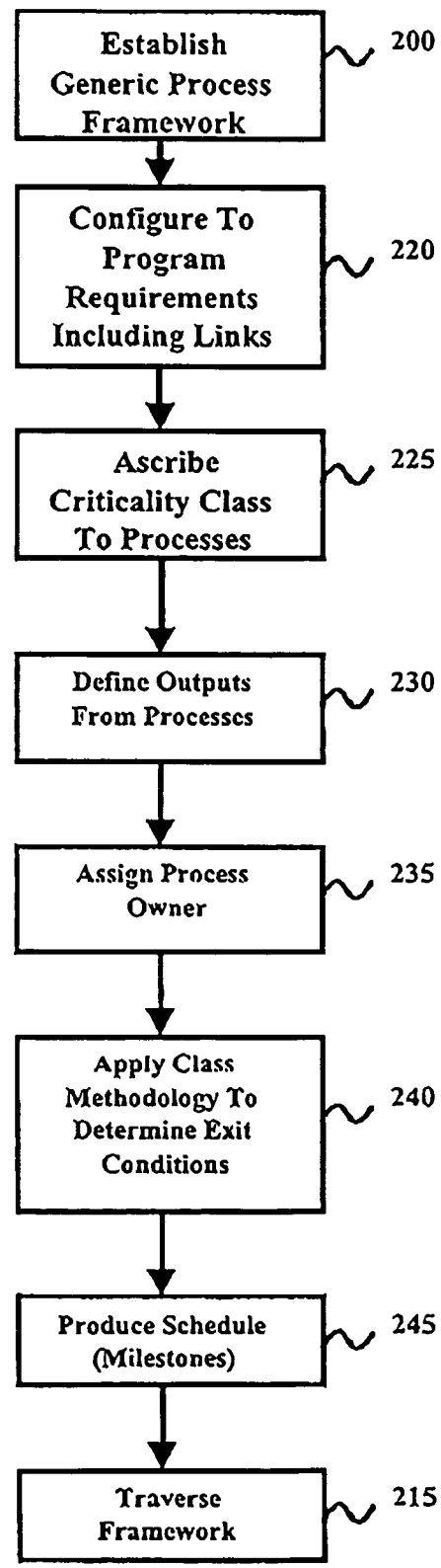

FIG. 5B shows alternate broad process steps that are undertaken in establishing and performing a build and operate program in another embodiment. Steps in common with FIG. 5A have like reference numerals.

A generic program framework 10 is established (step 200) having build, operate, and management processes as described above with reference to FIG. 1. It is then necessary, in step 220, to configure the program requirements, including links between the specific processes. Typically this is performed by bringing together a number of stakeholders to consider all possible inputs to, and outputs from the program, together with all specified or required deliverables or products and service (ie. outputs).

In step 225, each process, or linked process stream, is considered from the point of view of its criticality to the program. Criticality takes into account in known or assessed risk factors and quality considerations. The step of ascribing processes to criticality classes generally means that more project time is allocated to processes that involve high degrees of risk or more demanding levels of quality. The consideration of risk and quality in the definition of program processes obviates the need to consider risk and quality as functions of individual tasks, as is known in the prior art. Depending upon the decided rating, the process is ascribed to a specific class.

In step 230, a negotiation takes place to define specific outputs from each process, providing inputs to a linked process or processes. Subsequently, an individual process owner is assigned to each process (step 235). The idea of responsibility for processes being ascribed to individual persons is a feature of the invention that differs from the prior art. One incident of ascribing owners to processes is that each such person then also owns the risk, and must plan, manage and report on that risk. This onus has the effect of decreasing the likelihood that critical processes will fail for want of attention.

In step 240, the processes have a respective methodology, determined by their criticality class, applied to them to determine the exit conditions that apply (remembering that the links and outputs between processes have already been defined). As it would be expected, those processes in the class having the greatest criticality will have, on average, the greatest number of exit conditions applying.

Now that the framework has been fully populated (in terms of the definition of processes, links, outputs and exit conditions), the discrete outputs are entered into a scheduling tool (step 245) so that tasks can be planned in time, and then followed. Certain sets of links and exit conditions are grouped to form milestones which are used to assist in monitoring the execution of the program. This will be described in further detail presently.

The configured framework thus can now be traversed to execute the program (step 215), with status reports against milestones providing the primary schedule control mechanism.

The broad steps relating to performance of a build and operate program as described above will now be further described with reference to a specific example, namely that of staging an Olympic Games.

Olympic Games Example

To place the size of the program that constitutes the Olympic Games in perspective, it is useful to mention certain statistics concerning the Year 2000 Olympic Games held in Sydney, Australia. About 10,300 athletes will be competing overall. There are 28 sports conducted over 640 morning, afternoon and evening sessions at 30 venues. In addition to the athletes, there are 5,100 officials, 50,000 volunteer workers, and 12,000 accredited media. The broadcast audience is estimated at 3.5 billion. The main stadium, at which Athletics is conducted, has a capacity of 110,000 spectators.

In terms of computing and telecommunications resources, 80 IBM MQ series servers and 3 IBM S/390 mainframes are deployed. Additionally, there will be 17,000 desktop and portable computing devices in use, as well as numerous other peripheral devices such as printers, validators and displays. An estimated 13 million lines of program code was written to implement all the necessary applications.

Figure 6:
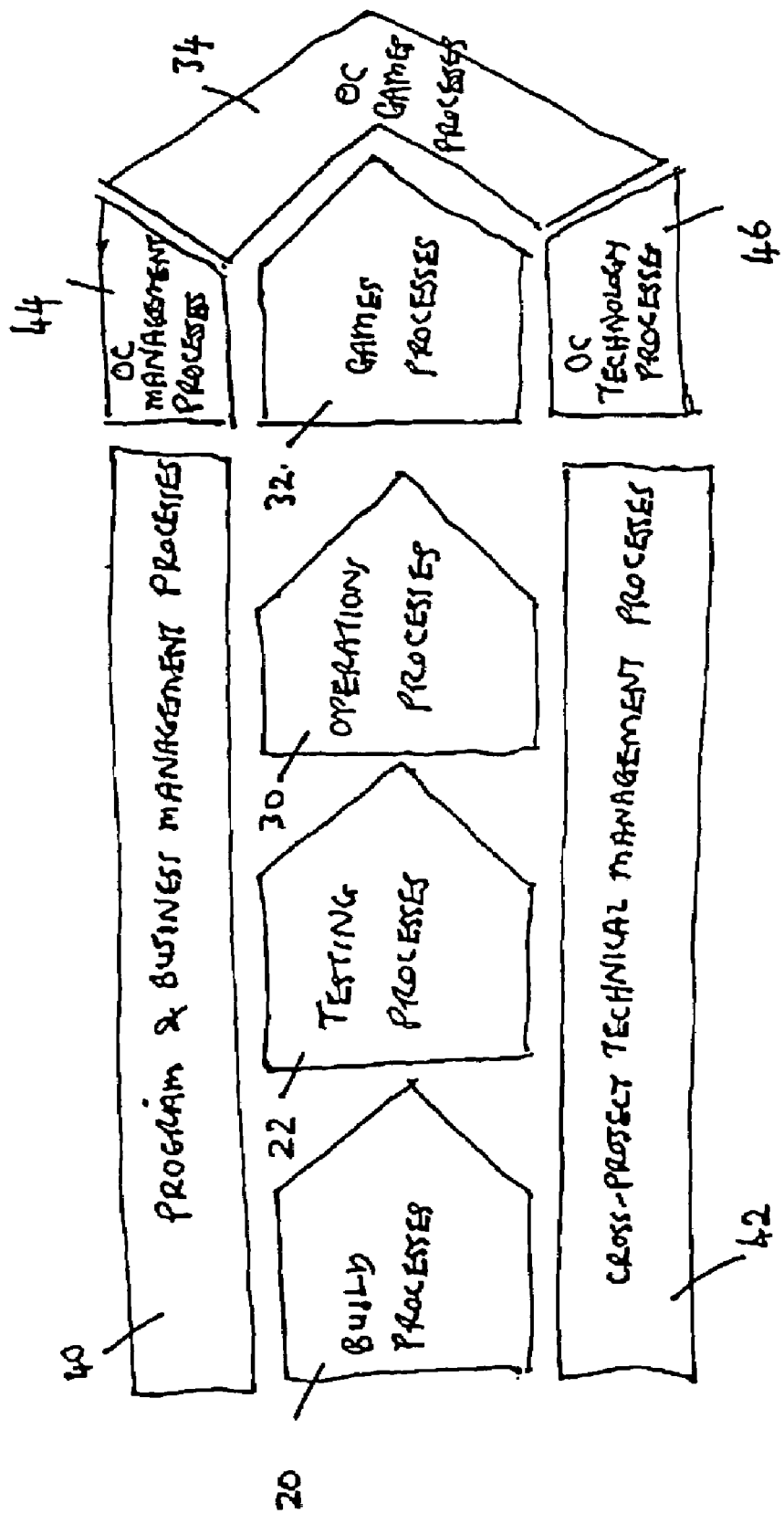
FIG. 6 is a schematic block diagram embodying the invention relating to an Olympic Games program.

FIG. 6 is a high level representation of the build, operate, and management processes. This level of process definition has partial correspondence with step 210 in FIG. 5A and step 220 in FIG. 5B. As shown in FIG. 6, there are two basic build process stages 20, 22, called "Build Processes" and "Testing Processes". These processes 20, 22 are related as essentially sequential blocks. The links between processes have not been shown for clarity purposes.

A first operations processes 30 follows the testing processes 22. There are two broad management processes, the first being a Program and Business Management Processes 40, the second being a Cross-Project Technical Management Processes 42. These two management processes 40, 42 will have links across the build processes 20, testing processes 22, and operations processes 30.

The particular circumstances of this Olympics program are that there is one principal contractor responsible for the building processes and some of the operations processes, and the management processes associated with those. There are a number of sub-contractors involved in various of the build processes. There is additionally a governmental Organising Committee ("OC") sharing some of the management processes and the operations processes. Such a distribution of ownership may not be adopted in future Olympic Games. The distribution of ownership could be arranged such that there was a single party having total responsibility, or many more than two principal parties having ownership. The program framework of the present invention can accommodate such a range of ownership because of the deterministic nature of the individual processes ownership and exit conditions that allow a link therebetween to be traversed, whereas prior art arrangements would be found deficient if such complexity in ownership were present.

The second operations process is the Games Processes 32. These processes 32 have links with the Organising Committee Games Processes 34, and both of those operations processes are influenced by the OC Management Processes 44 and the OC Technology Processes 46.

It is to be understood that while the build and operate processes are shown as being generally sequential in time, there is, in fact, considerable overlap, in that some operate processes begin before all build processes are completed. The analogy is that the framework is traversed in a spreading nature, rather than a strict sequence.

Figure 7:
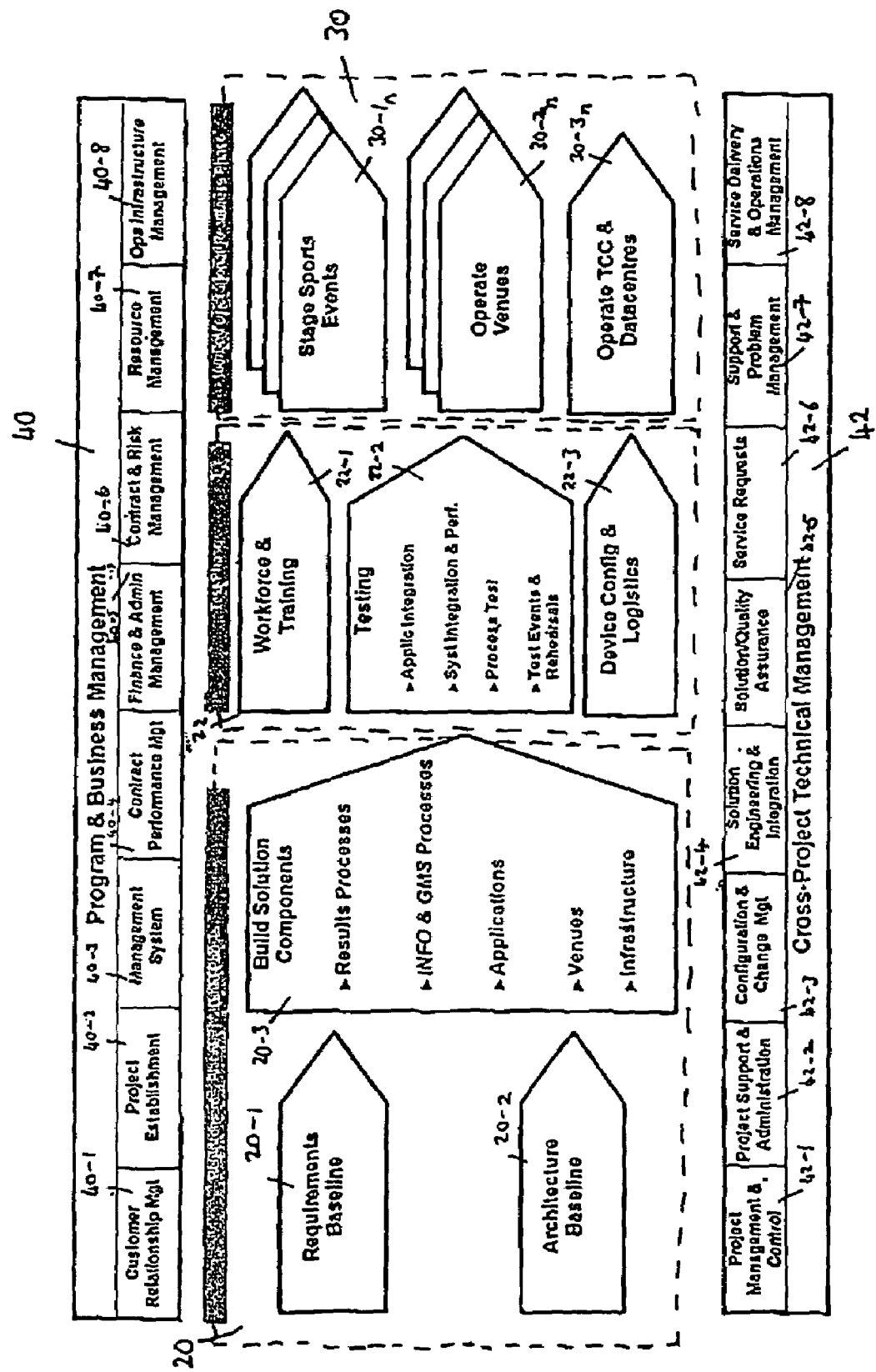
FIG. 7 is a schematic block diagram showing sub-processes of the processes in FIG. 5.

FIG. 7 shows, in the next level of detail, component processes within the generalised processes shown in FIG. 6. The first build processes 20 are constituted by Requirements Baseline processes 20-1 and Architecture Baseline processes 20-2, which each have links to the Build Solution Components processes 20-3. There are eight program and business management processes, and eight cross-project technical management processes, most of which operate across all build and processes.

The program and business management processes 40 are named in FIG. 7 and designated 40-1 to 40-8. Similarly for the cross-project technical management processes 42, designated 42-1 to 42-8. There can be lower level or management sub-processes that link with individual build or operate processes, although these are not shown in FIG. 7.

The build processes 22 comprise of three groups of processes. The first is the Workforce and Training processes 22-1. Additionally, there is the Testing processes 22-2 and the Device Configuration and Logistics processes 22-3.

The operations processes 30 comprise a plurality of Stage Sports Events processes 30-1$_n$, a plurality of Operate Venues processes 30-2$_n$, and a plurality of Operate TCC and Data-centres processes 30-3$_n$.

Figure 8:
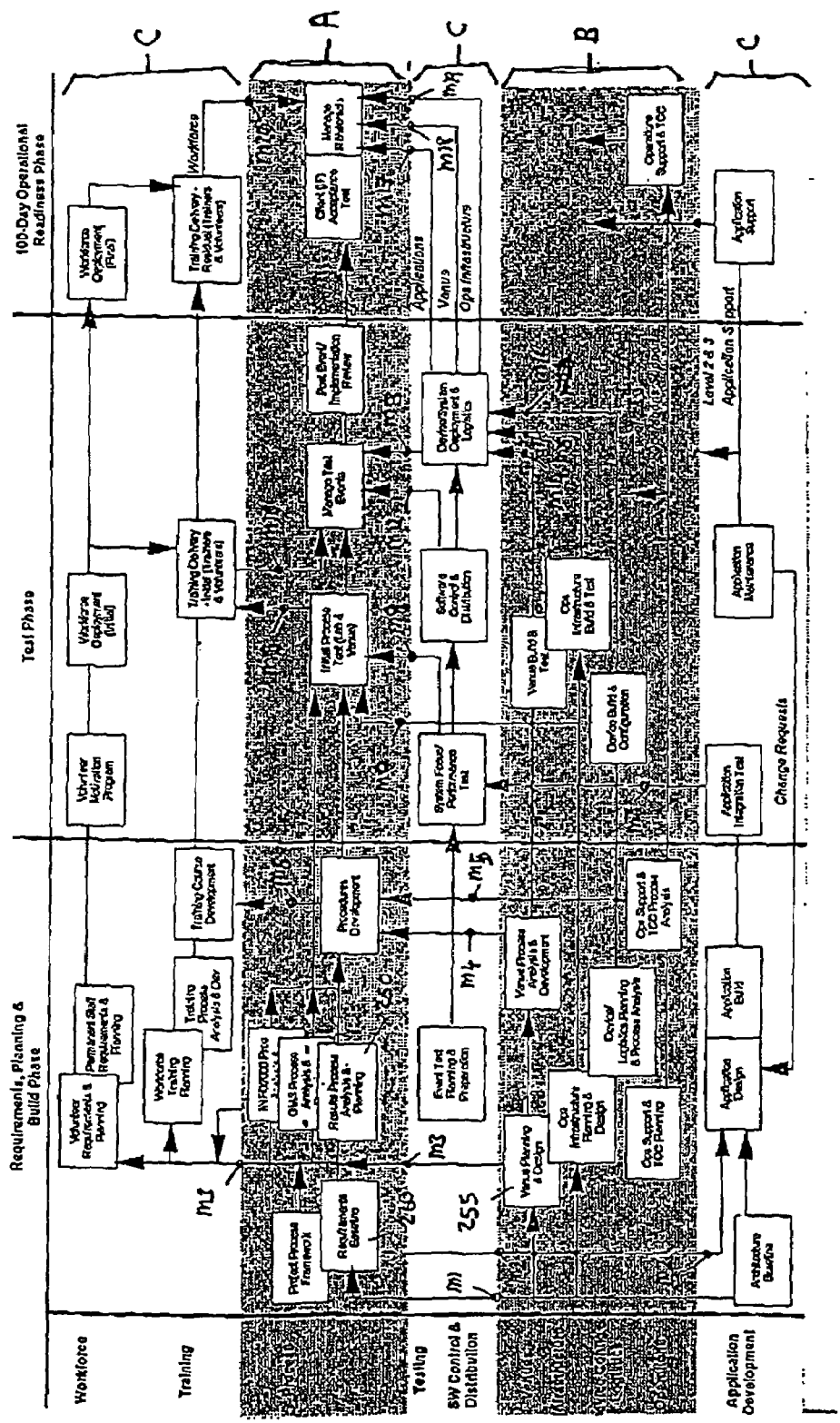
FIG. 8 is a schematic block diagram showing underlying activities of an Olympic Games program.

FIG. 8 is at the individual process level, showing processes and their linkages, within the build processes phase 20, testing processes phase 22, and operations processes phase 30. As such, it equates broadly to step 210 in FIG. 5A and specifically to step 220 in FIG. 5B. For clarity, links with the Program and Business Management processes 40 and the Cross-project Technical Management processes 42 have been omitted. Each link constitutes an output from a process and an input to another process. In fact, a single link may represent multiple outputs (which otherwise are omitted for the sake of clarity).

A representative listing of the build, operate and management processes created for the Sydney Olympics is shown in the following Tables:

TABLE 1

Program &Business Management Processes

| Customer Relationship Management | Project Establishment | Management System | Contract Performance Management | Finance & Admin Management | Contract & Risk Management | Resource Management | Program Operations Infrastructure Management |
|---|---|---|---|---|---|---|---|
| P10 Customer Satisfaction & Expectation Mgt | P15 Organisation Definition | P18 Project Management Plan (PMP) | P11 Customer Performance Reviews | P32 Finance Mgmt | P20 Risk Mgmt | P09 Sub-Contractor Management | P57 Performance & Service Level Monitoring & Reporting |
| P06a Customer Deliverables Mgt P14 Project Issue & Action Mgt | P16 Project Process Framework | P25 Process Management | P49 Internal Project Performance Reviews | P33 Procurement | P37 Contract Mgmt | P31 HR Management | P58 Develop & Maintain SLAs |
| P63 SOCOG Policy Submission & Review | P17 Master Schedule & Contract Calendar P38 Communication | P111 Process Analysis & Planning | P98 Post Event/Implementation Reviews P99 Client (IF) Acceptance | P34 Asset Mgmt P39 | | P35 Skills Management &Training P54 Logistics Management | P60 Operations Support &TCC Planning P140 Operations Infrastructure Planning & Design |

TABLE 2

Cross-Project Technical Management Processes

| Project Management &Control | Project Support & Administration | Configuration &Change Management | Solution Engineering &Integration | Solution/ Quality Assurance | Service Requests | Support & Problem Management | Service Delivery & Operations Management |
|---|---|---|---|---|---|---|---|
| P01 Sub-Project Detailed Planning | P30 Sub-Project Support &PMO | P21 Change Management | P05 Architecture Baseline Management | P24 Quality Mgmt | P55 Service Requests | P52 Problem Management | P12 Service Delivery & Operations Mgtmt |
| P02 Sub-Project Tracking & Status Reporting | P28 Document Management | P22 Configuration Management | P04 Solution Technical & Engineering Mgt | P06 Deliverables Mgtmt | | P64 Operations Change Management | P56 Operations Systems & Tools |
| P13 Sub-Project Issue & Action Management | P29 Sub-Project Records Mgt & SPCBs | | P40 E2E Solution Delivery Process & Methods | P26 Software Delivery Mgmt P27 Software Detect Mgmt | | P65 Operations Support Management | |

TABLE 3

(Partial) Build and Operate Processes

| Workforce Stream | Process Stream | Application Development Stream | Venues Stream | Infrastructure Stream | Device Configuration & Logistics Stream | Operations Stream |
|---|---|---|---|---|---|---|
| P100 Workforce Management | P03 Requirements Baseline Mgmt | P05 Architecture Baseline Management | P130 Venue Planning & Design | P140 Operations Infrastructure Planning & Design | P59 Device/Logistics Planning & Process Analysis | P60 Operations Support &TCC Planning |
| P101 Workforce Planning | P16 Project Process Framework | P120 Application Design | P131 Venue Process Analysis & Development | P142 Operations Infrastructure Build &Test | P71 Device Build &Configuration | P61 Operations Process Analysis & Development |
| P102 Workforce Deployment | Application Owner | P121 Application Build | P132 Venue Build &Test |  | P73 Device/System Deployment & Logistics | P65 Perform Operations Support |
|  | P90 Application Support | P122 Application Maintenance |  |  |  |  |
|  | P111 Process Analysis & Planning | P123 Application Integration Test |  |  |  |  |
| P103 Volunteer Motivation | P112 Procedures Development |  |  |  |  |  |
| Training Stream | Event Planning & Assurance Stream | Test Stream | Software Delivery & Distribution Stream |  |  |  |
| P105 Workforce Training Management | P98 Post Event/Implementation Review | P124 Delivery Verification Test | P26 Software Delivery |  |  |  |
| P106 Workforce Training Planning | P99 Client (IF) Acceptance Test | P125 Event Test Planning & Preparation | P74 Software Control & Distribution |  |  |  |
| P107 Training Course | P115 Plan &Manage Test Events | P127 Systems Focus Test |  |  |  |  |
| P108 Training Delivery | P116 Plan &Manage Rehearsals | P128 Process Test |  |  |  |  |
|  |  | P129 User Acceptance Test (GMS, INFO, WNPA etc). |  |  |  |  |

TABLE 4

(Partial) Operate Processes

| Customer Relationship Management | Run the Games (Technology) | Manage the DCF | Manage Venues | Operate Extended TCC | TCC Mgtmt & Administration | Operations Management | Application Support |
|---|---|---|---|---|---|---|---|
| P08 Hosting/ Hospitality | P38 Communicate with all Stakeholders | In the TCC P70 Manage the DCF | In the TCC P80 Manage & Support VITMs | P23 Games-Time Test Mgmt | P44 Technology Partner Interface Mgmt | P12 Service Delivery & Operations Mgmt | P90 Application Management &Support |
| P10 Customer Satisfaction & Expectation Management | P47 Games Operations Reporting | In the DCF P22 Configuration Mgmt | For each Venue P76 Perform Venue Operations Continuity Mgmt | P75 Datacentre Disaster Recovery | P49 Internal Project Perf. Reviews | P45 Data Quality Control | P91 Application User Processes |
| P14 Issue & Action Management | P50 Technology Command & Control | P41 Device Asset Mgmt | P81 Operate Non-TCC Venues | P77 Switch to DR Site | P52 Problem Management | P65 Perform Operations Support | P92 Application Operation |
|  | P53 Critical Situation Management | P72 Deliver Maintenance |  | P86 Datacentre Mgmt | P54 Logistics Management | P83 Systems &Technology |  |
|  | P66 Games-Time | P73 Device/ System |  |  | P55 Service Requests | P84 Network Management |  |

TABLE 4-continued (Partial) Operate Processes

| Customer Relationship Management | Run the Games (Technology) | Manage the DCF | Manage Venues | Operate Extended TCC | TCC Mgtmt & Administration | Operations Management | Application Support |
|---|---|---|---|---|---|---|---|
| | Planning & Coordination P67 Reporting to IBM HQ | Deployment &Logistics P74 Software Control & Distribution | | | P57 Performance &Service Level Monitoring & Reporting | P85 Provide Interface to Internet | |
| | | | | | P64 Operations Change Mgmt | P89 Data Management &DBA | |
| | | | | | P68 Shift Rostering | | |
| | | | | | P69 TCC Administration | | |
| | | | | | P82 Facilities & Equipment Mgmt | | |
| | | | | | P87 Backup & Recovery | | |
| | | | | | P88 Security Management | | |
| | | | | | P91 Run TCC Applications | | |
| | | | | | P100 Workforce Management | | |
| | | | | | P102 Workforce Deployment | | |

Process Outputs

Figure 9:
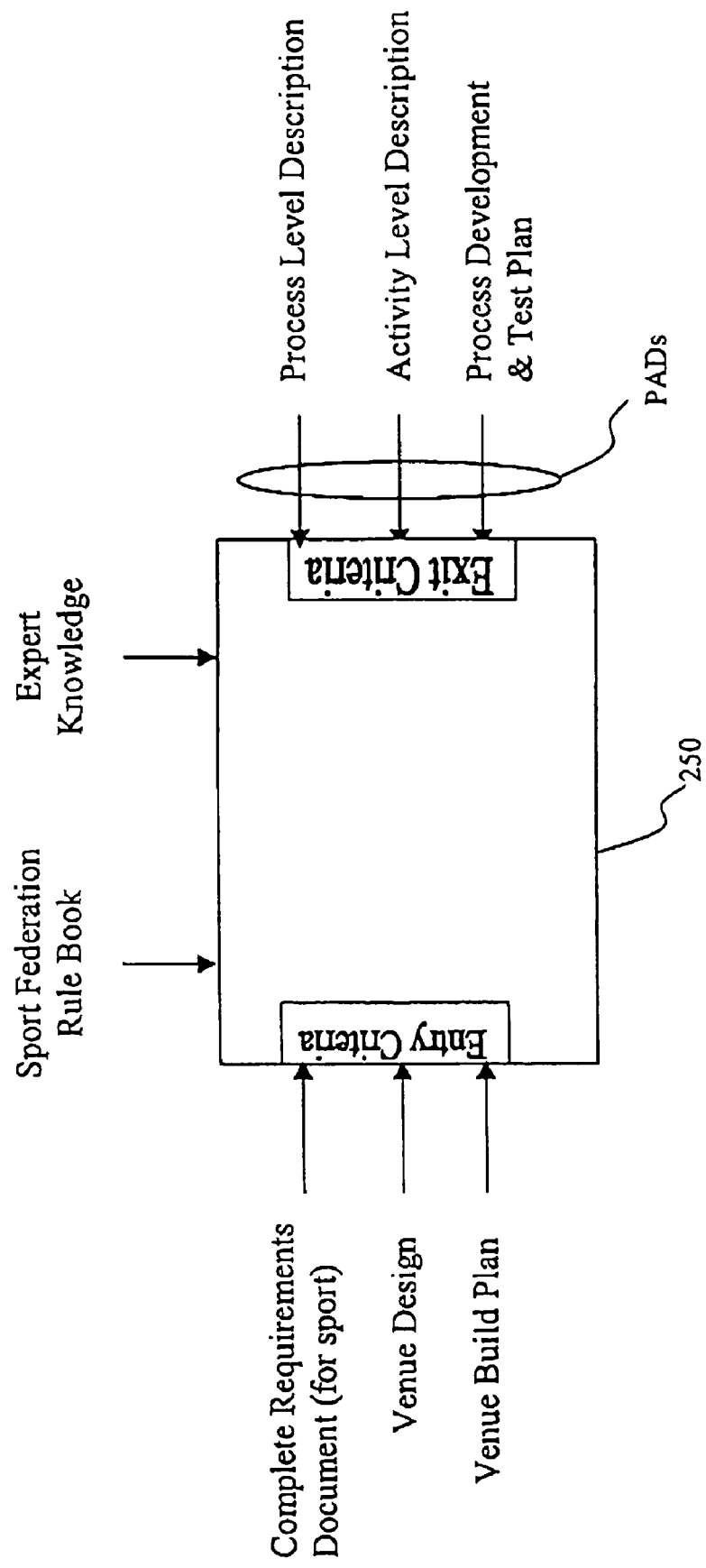
FIG. 9 is a diagram showing a generalised build process and associated outputs and exit conditions.

FIG. 9 is an expanded view of the "Results Process Analysis & Planning" (RPAP) process 250 shown highlighted in FIG. 8 showing its agreed outputs and exit conditions.

The input links to the RPAP process 250 are on a 'per sport' basis. That is, the process has, for the Olympic Games, twenty-three sets of inputs and corresponding outputs. Considered then on a per sport basis, the inputs are:
 (i) complete requirements documents,
 (ii) venue design,
 (iii) venue build plan,
 (iv) Sport Federation Rule Book, and
 (v) expert knowledge.

Items (i) to (iii) are signified as being "entry criteria", which is intended to mean that each has complied with an agreed program template, and has been accepted by the Program Technical Review Panel. This is really the same thing as having satisfied exit criteria from the respective preceding process (ie. Venue Planning & Design 255, and Requirements Baseline 260).

The outputs (ie. 'deliverables') in this instance are:
 (i) process level descriptions
 (ii) activity level description, and
 (iii) process development & test plan.

The "exit criteria" for each output are, as it happens, the same as the "entry criteria" mentioned above.

Traversing the Framework (Executing the Program)

Figure 10:
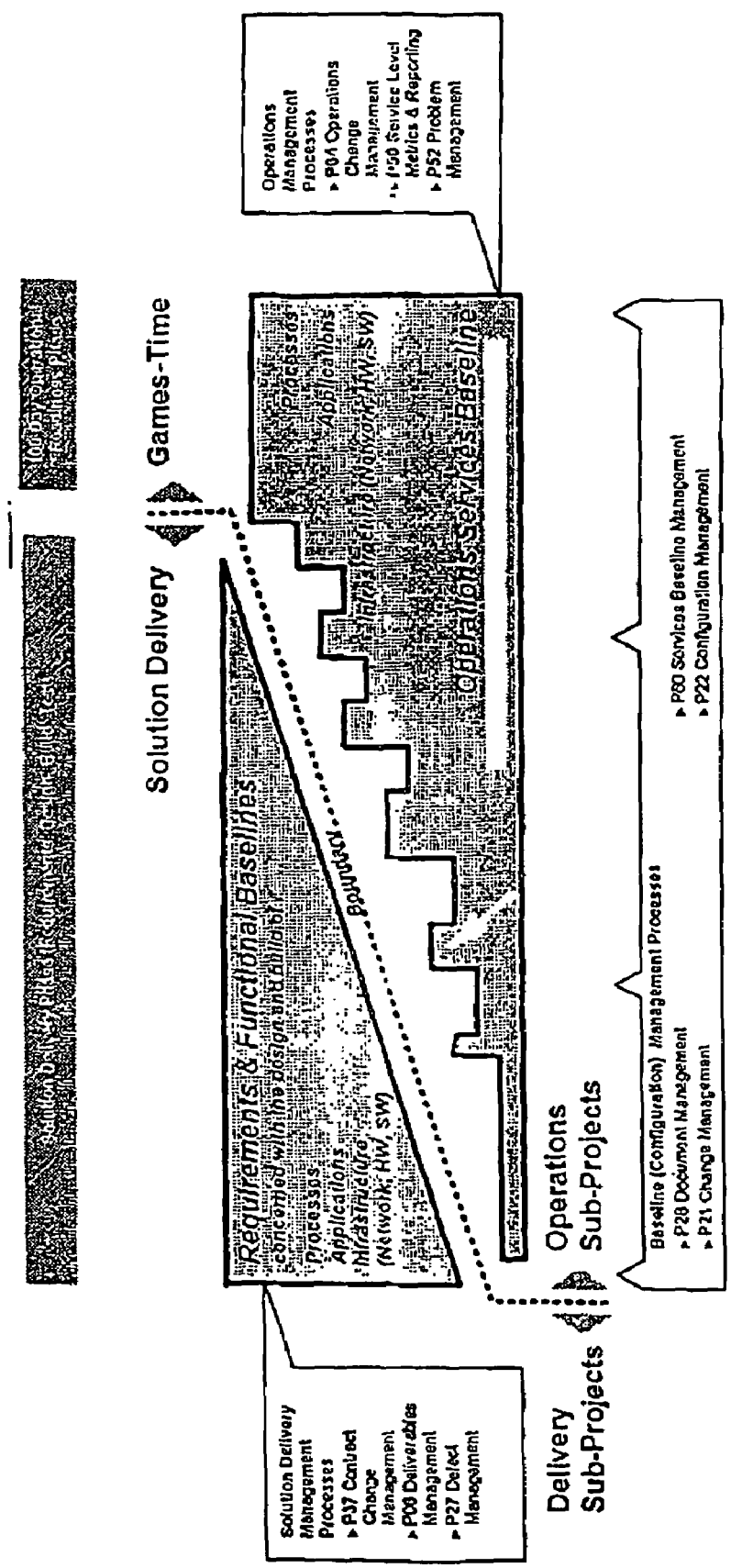
FIG. 10 is a schematic block diagram showing staged transition from build to operate process phases.

FIG. 10 is a conceptualised representation that demonstrates the staged transition between build and operate phases.

In FIGS. 6, 7 and 8, the boundary between build and operate phases is shown as discrete, and implies that it occurs in a single point in time. In actuality, the boundary is rather that represented in FIG. 10, where there is a staged transition, in that, as noted above, many operate processes begin before all build processes are completed.

In a temporal sense, some operate processes will commence during a time that is principally concerned with testing processes, and even earlier than build processes. The transition between build and operate concludes with the completion of all build processes, and for the present example, is at a point in time 100 days prior to opening of the Olympics (the "100 Day Operational Readiness phase").

Referring then to the operations processes phase shown in FIG. 10, it can be seen that there are various "peaks" that occur during time. These correspond with scheduled Test Events, where there is a staged operations rehearsal. With each subsequent such rehearsal, a greater proportion of the total Olympics operations processes are practised.

FIG. 10 also shows how some program management process occur only in the build or the operate phase, whereas others occur in both. The three processes (P37, P06 and P27) listed on the left-hand side occur only in the build phase. The three process (P64, P58 and P58) listed on the right-hand side occur only in the operate phase. The four (management) processes (P28, P21, P60, P22) shown along the bottom occur in both phases. However, because of the gradual transition from build to operate, all may be operating at the same points in time. This arrangement is designed to clarify to build and operate teams the correct process to use for problem and change management depending whether the component is in the build or operate environment (ie. P37 is broadly equivalent to P64, P06 to P58, and P27 to P52).

Process Assurance Classes

As described with reference to step 215 of FIG. 5, once the links and outputs between individual processes have been established, it is necessary to determine the assurance level of individual processes and describe each to an appropriate class. In the present example, four classes are utilized, as follows (in order of most critical to least critical):

TABLE 5

| Assurance Class | Methodology |
| --- | --- |
| A | OPM |
| B | OR100 |
| C | SIPOC |
| D | Manual |

The allocation of assurance class is performed objectively, and takes into account program deliverables in terms of products and services and an assessment of risk and quality assurance at a macro level. This assessment will necessarily include a consideration of contract obligations as a starting point.

Category A processes are those that are mission critical, where failure would have a major impact. Such processes require formal Failure Mode Critical Analysis and risk mitigation.

Category B processes are those that require a formal service level agreement.

Category C processes are those involving multiple teams and where entry and exit criteria, and scheduling milestones, need to be explicitly defined.

Category D processes are those involving a single team which has the experience to manage the risk associated with the process.

A. OPM

The acronym OPM stands for Olympic Process Methodology. The methodology is known per se. This name is chosen for convenience, and it is to be understood that the methodology is not restricted only to use in the context of an Olympic Games.

For the purpose of illustration, the example given refers to the Results Process Analysis & Planning process 250 shown in FIG. 8. This process has as its outputs the documents shown in FIG. 9, for convenience known collectively as Process Analysis Documents (PADs)—one for each sport. PADs are developed taking into account Failure Mode Criticality Analysis then risk mitigation, and in this way seek to maximise the ability to detect problems and minimise the negative impact and cost by recognizing problems before they occur.

For the purpose of explanation, the sport of Badminton will now be considered.

Figure 11:
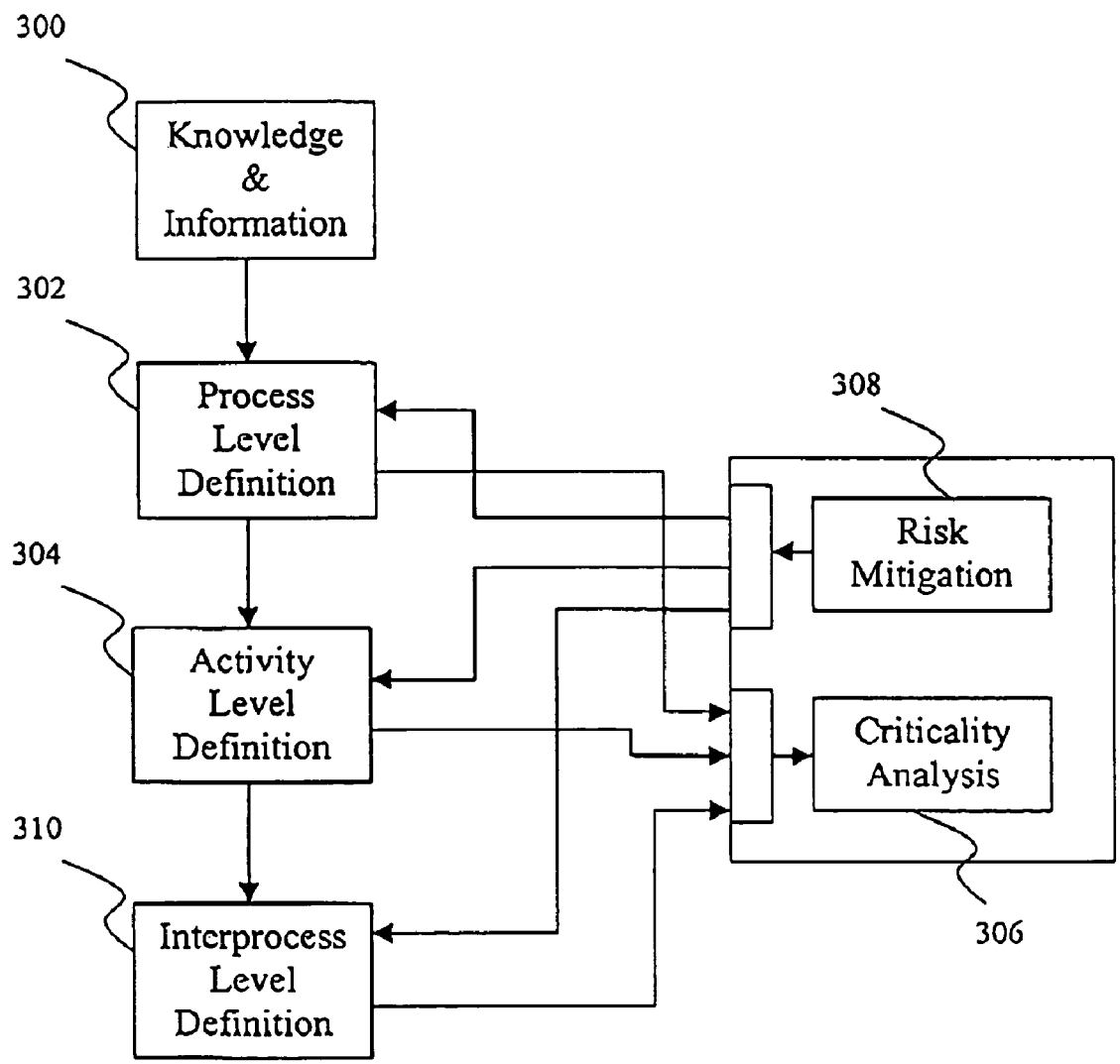
FIG. 11 is a schematic block diagram showing the OPM methodology in a generalised manner.

Referring now to FIG. 11, the knowledge and information previously gathered (see also FIG. 9), in step 300, is input to a process level definition process, in step 302.

Figure 12A:
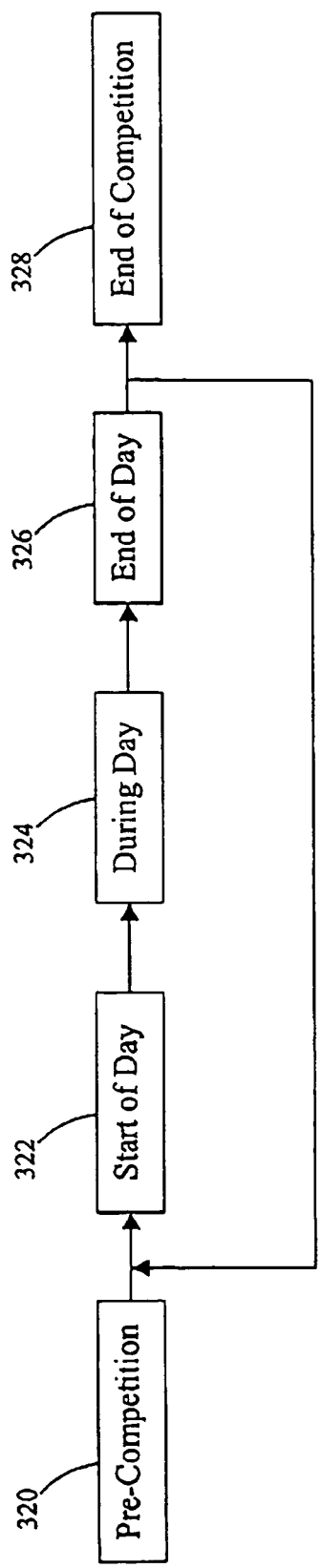
Figures 12D, 12E:
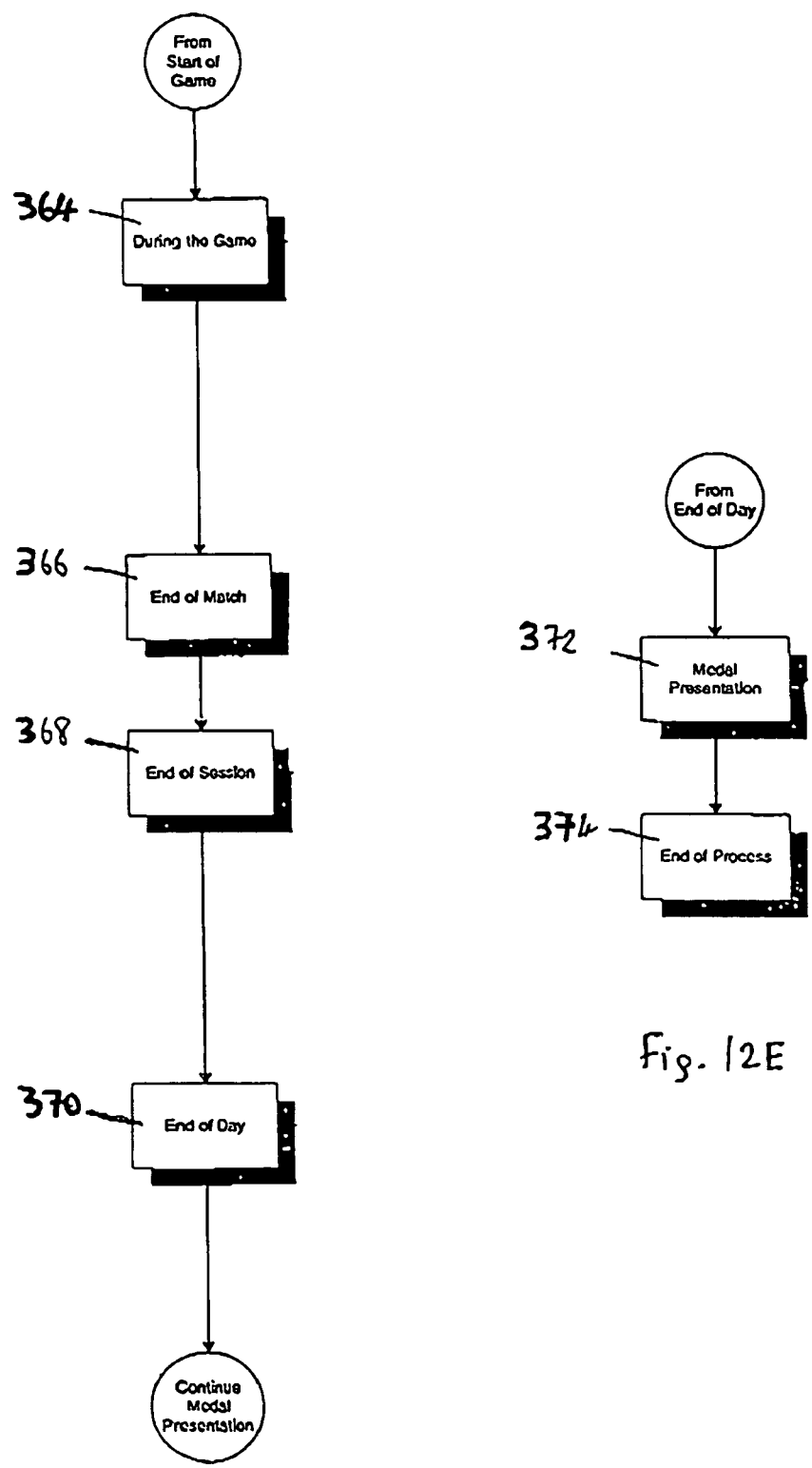

FIG. 12A shows the basic sequence of events for Badminton. The phases are pre-competition 320, competition 322-326, and end-of-competition 328. FIGS. 12B-12E show this sequence in greater detail, in the form of Process Level Definitions (PLDs), with the process steps 340-374 being self-explanatory. During this step the knowledge and information obtained/gathered in step 300 is critically analysed to determine general areas of risk. In addition typical sport exception scenarios would be created which have been known to cause system failures in the past. Notes are made of these risk areas and potential risk mitigation strategies. At this point, target acceptable risk levels are agreed, based upon process criticality. This is described below as the assignment of Risk Factors (RFs).

Figure 13:
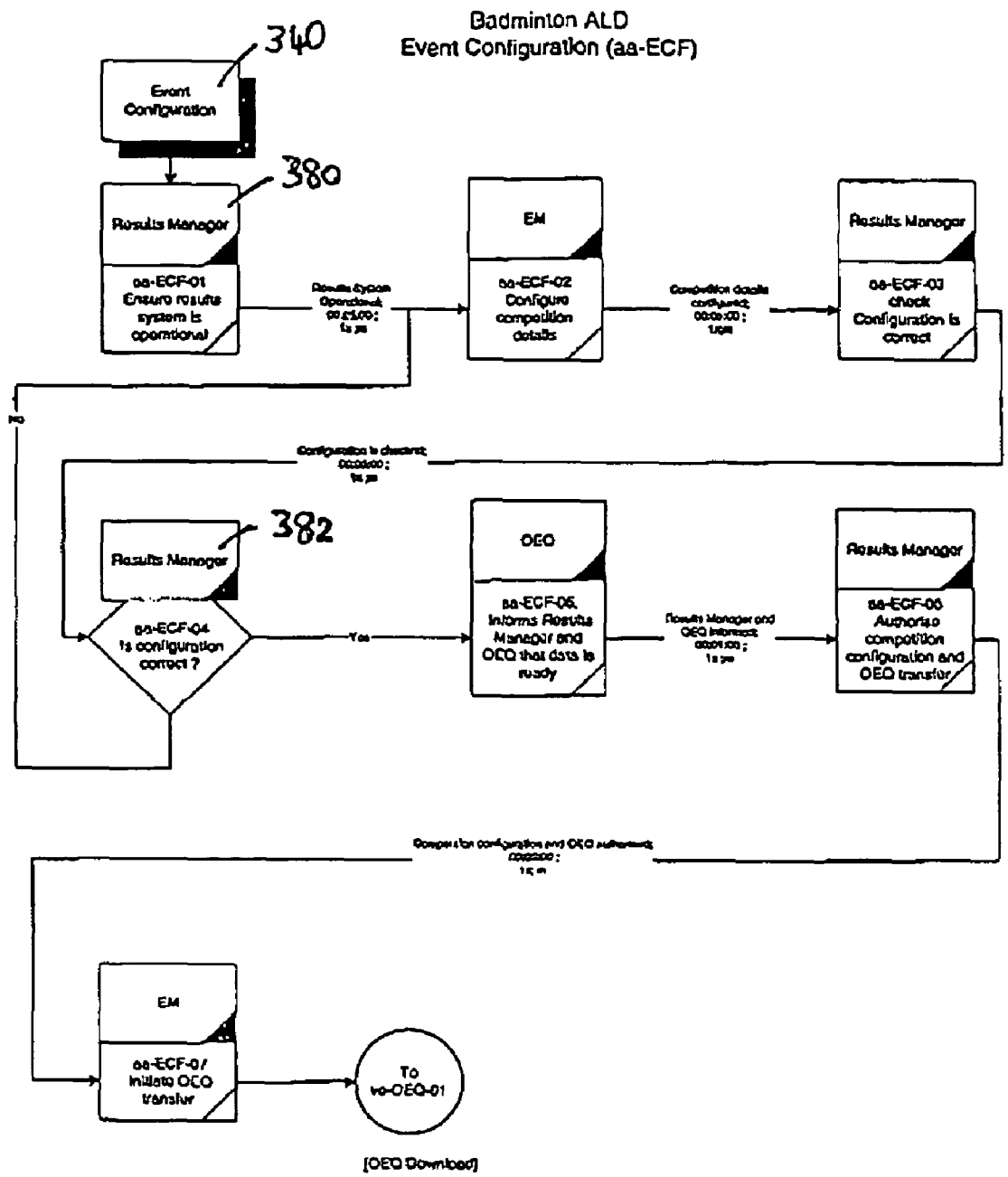
FIGS. 13 and 14 show an Activity Level Definition (ALD) diagram for two Badminton processes.

In step 304, the Activity Level Definition process occurs. The initial definition similarly takes into account the risk areas, critical analysis and potential risk mitigation strategies identified in step 302. The completed ALD is then subjected to a formal criticality analysis (step 306) followed by risk mitigation (step 308). FIG. 13 shows the Badminton ALD for the "Event Configuration" process 340.

For the purposes of the PAD (which includes the PLD and related ALD), the following identification scheme has been adopted, which is used in the ALD specifically to show dependencies.

TABLE 6

| Name of ALD | PAD## | Description of ALD |
| --- | --- | --- |
| Event Configuration | aa-ECF | Check Event Configuration and OEQ transfer |
| After Entries Deadline | ab-AED | Check OEQ download data, verifies and updates |
| Late Change request | ba-LCR | Requests late change, verifies and approve results |
| Before the Draw | ca-BTD | Print for Control reports Entry List and distributes Pre-Draw Reports |
| During the Draw | da-DTD | Conduct Draw and assist with Draw |
| After the Draw | ea-ATD | Receive Draw List, Print for Control Draw Results |
| Draw Press Conference | fa-DPC | Preparation for Competition Reports |
| Midday before Competition | ga-MBC | Preparation for Court Assignments |
| Start of Day | ha-SOD | Start Badminton Application ready for Event |
| Start of Session | ia-SOS | Preparations for Official Assignments |
| Before the Match | ja-BTM | Entering finished starting line up |
| Start of Game | ka-SOG | Record start of game |
| Duration of Game | la-DTG | Initiate play by play |
| End of Match | ma-EOM | Verification of scoresheet and checking |
| End of Session | na-EQS | Generate match report to preparation for playing assignments and schedules |
| End of Day | oa-EOD | Discusses End of Day day by day activities and results |
| Medal Presentation | pa-MDP | Print for Control for Medal Presentation |

Referring to the first sub-process 380, the symbol used is in two halves. The upper half indicates the sub-process owner, in this case the Results Manager. The lower half represents a unique task number ("as-ECF-01") and a written description: "Ensure results system is operational". The output of the sub-process is expressed as four variables: trigger, timeframe, frequency, and mode. In this example, the trigger (ie. for the next sub-process) is 'results system operational', the timeframe is 5 minutes (i.e. hh:mm:ss format), the frequency is one time ("1×"), and the mode is 'manual'.

Referring to sub-process no. 382, it can be seen that the sequence includes decision elements. Here, it is asked "Is configuration correct?", and a branching occurs depending upon the answer 'yes' or 'no'.

Figure 14:
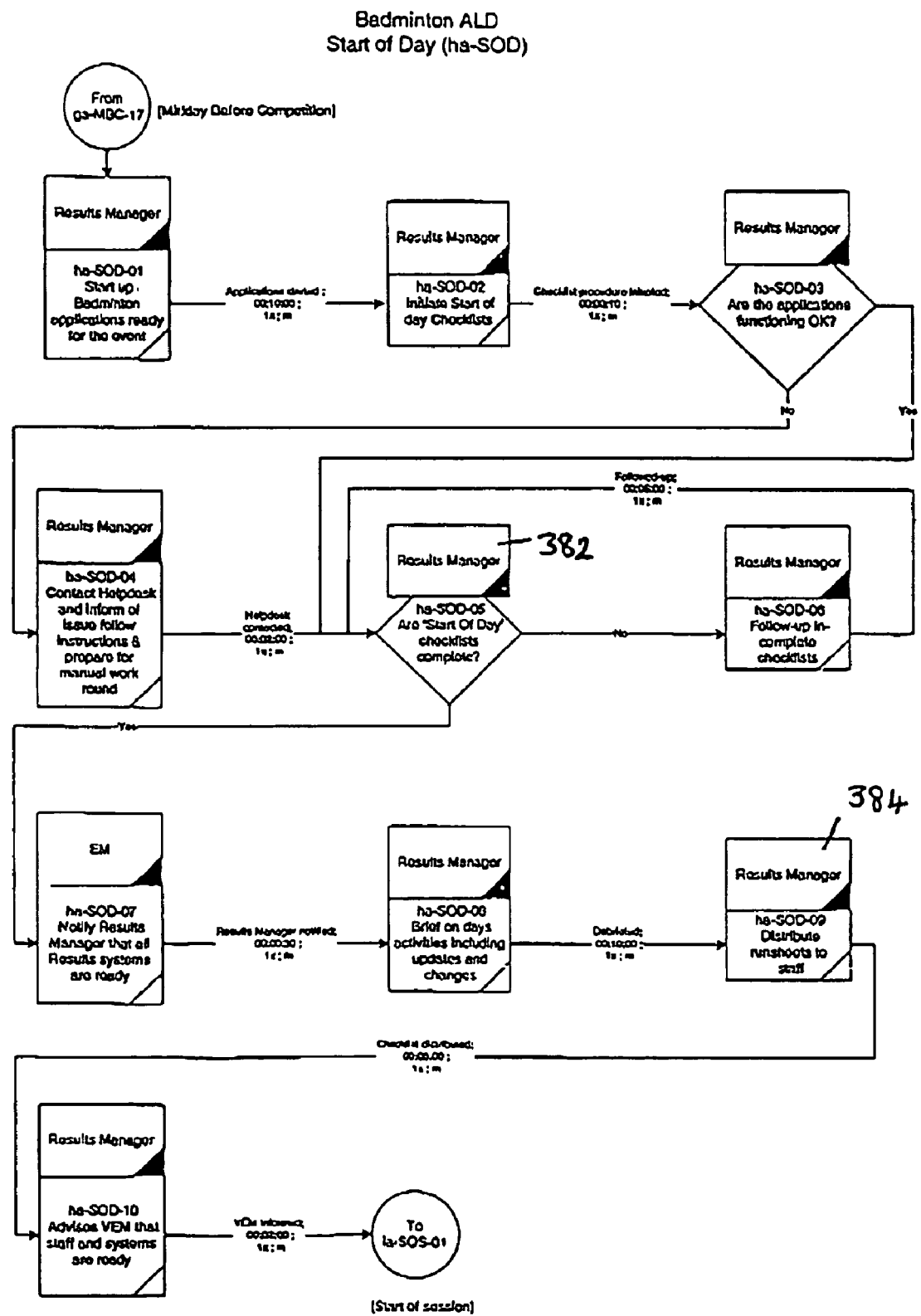

FIG. 14 shows a further example, in this case the Badminton ALD for the "Start of Day" process 356. Referring to sub-process no. 382, it can be noted that the decision element that has three inputs. This exemplifies that multiple inputs can exist.

The ALD can also indicate deliverables (not shown in these examples), such as printed reports or data feeds to other related processes, such as television broadcasting.

Referring now to FIG. 11 again, in step 310, Interprocess Level definitions (ILDs) are prepared. Their purpose is to define interprocess dependencies, and are useful as a management tool, but also in assessing criticality of the interfaces between processes.

Figure 15:
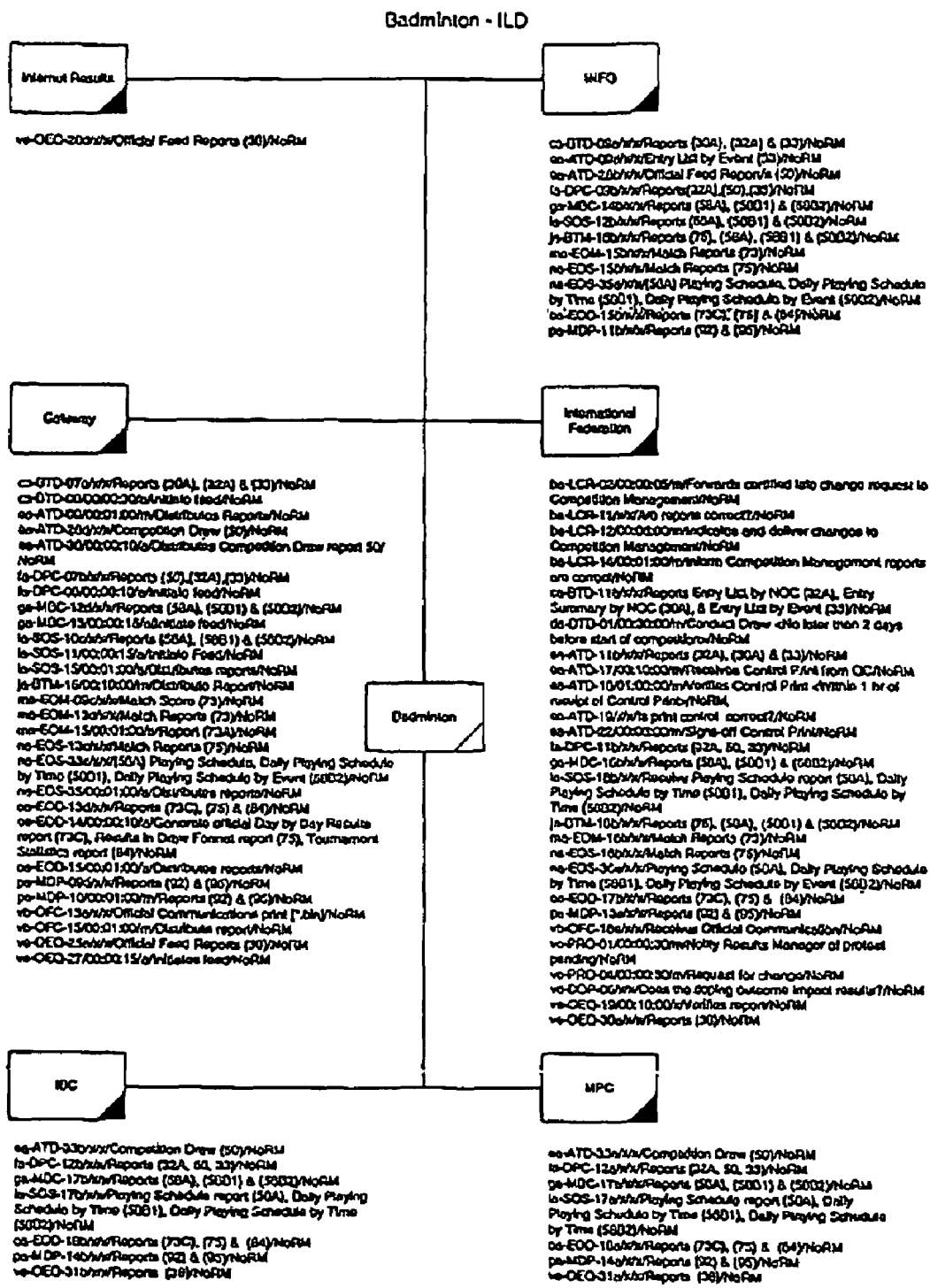
FIGS. 15, 16A and 16B shows an Interprocess Level Definition (ILD) diagram for interprocess dependencies relating to Badminton.
Figure 16A:
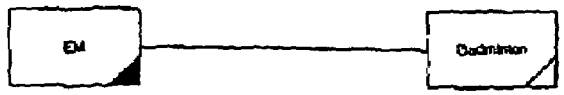
Figure 16B:

For the sport of Badminton there are forty-six different process owners. With such a large number of actors it becomes difficult to appreciate criticality in a meaningful way without some formal mechanism. This information is provided by the ILDs. FIG. 15 shows a portion of the ILD for Badminton, representing the relevant process responsibilities of the "Internet Results Team", the "INFO Application Team", the "Gateway Operators", the "International Federation", the "International Broadcast Centre", and the "Main Press Centre". The potential risk can be easily assessed (in part) by the number of sub-processes owned by each actor. In this case, the critical service levels for the process are determined by the International Federation. When this process is critically analysed, of the forty-six actors, the one with the most critical sub-processes is the Event Manager (EM), which is shown in FIGS. 16A and 16B.

Once the ALDs are identified, a further failure mode criticality analysis review (step 306) is conducted to determine which of the activities have the higher risk of failure. Clearly this involves the analysis of the ILDs, as just described. One component of such a review is to determine Risk Factors and assess whether they meet the agreed RF level.

Risk mitigation strategies (step 308) are then devised to mitigate these risks (i.e. to reduce individual activity (and process) RFs), and the ALDs (and PLDs) are modified accordingly.

The risk mitigation analysis includes three steps:
1. Explore options to mitigate risk
2. Implement changes to process, activity or inter process dependencies
3. Reassess that the final risk of the process, activity or inter process dependencies is below the agreed "RF" level (normally RF2 or RF3)

In relation to the assignment of Risk Factors, a ten level scale is adopted:

TABLE 7

| RF# | Assessment given to each level of risk |
| --- | --- |
| RF1 | multiple alternate paths extremely low risk |
| RF2 | alternate paths available, very low risk |
| RF3 | failure is possible, some risk |
| RF4 | failure is very possible, moderate risk |
| RF5 | failure is very possible &likely |
| RF6 | failure is probable, risk is moderately high |
| RF7 | failure is probable &likely, risk is high |
| RF8 | failure is very probable &likely, risk is very high |
| RF9 | failure is almost definite, risk is extreme |
| RF10 | definite failure, unacceptable results |

These risk factors assist in determination of the critical activities within the process.

The criteria for the assignment of RFs, in this example, are:

Are processes fully defined, including dependencies?
Are there any existing alternative paths?
What is the risk of failure?
In the event of failure, how quickly does recovery occur?
For each of RF1-RF10, the criteria are:

RF1
fully defined processes, mostly defined dependencies
no existing multiple alternate paths result in failure
existing problems within the activity, process, interprocesses have been resolved successfully RF2
fully defined processes, some undefined dependencies, but no unknowns
no existing alternate paths result in failure
very low risk of failure is seen within the activity, process, or inter process
if failure of the activity, process or inter process occurs, recovery is immediate and successful RF3
fully defined processes, undefined dependencies, some unknowns
an alternate path can lead to failure (but highly unlikely)
low risk of failure is seen within the activity, process, or inter process
if failure of the activity, process, or inter process occurs, recovery is almost immediate, and mostly successful RF4
partially defined processes, undefined dependencies, many unknowns
alternate paths can lead to failure (and likely to occur)
moderate high risk of failure is seen within the activity, process, or inter process
if failure of the activity, process, or inter process occurs, recovery is not immediate, and is moderately successful RF5
some undefined processes, undefined dependencies, many unknowns
no alternate paths or alternate paths that lead to failure
risk of failure is seen to be as likely within the activity, process, or inter process as success
if failure of the activity, process, or inter process occurs, recovery is not immediate, and is not always successful.

RF6
a moderate number of undefined processes, undefined dependencies, many unknowns
single dependencies that can fail
risk is seen to be more likely to fail within the activity, process, or inter process than success
if failure of the activity, process, or inter process occurs, recovery is not immediate, and is not successful RF7
a high number of undefined processes, undefined dependencies, many unknowns
single dependencies that can fail, and are likely to fail
failure is much more likely to occur than success
if failure of the activity, process, or inter process occurs, no recovery or recovery is not immediate, and is not successful RF8
much of the process is undefined, with many unknowns
definite single dependencies that will fail due to large numbers of unknowns failure is the probable path for the process when failure of the activity, process, or inter process occurs no recovery is available

RF9 most of the process is undefined, with many unknowns multiple single dependencies that will fail due to large numbers of unknowns failure is the most likely path for the process when failure of the activity, process, or inter process occurs, no recovery is available

RF10 the process is undefined, with many unknowns undefined multiple single dependencies that will fail due to large numbers of unknowns failure is the only path for the process In exploring alternate paths, various ways of reducing the risk for each critical activity are considered. Changes are then implemented in order to achieve the reduction in risk. Finally, any change is assessed to determine whether it can successfully fit within the existing PLD or ALD. This mitigation thus can be seen as operating iteratively until a satisfactory RF# is achieved for each individual process, activity, or inter process dependencies. That is, for any activity, process or inter process dependencies, if a mitigation is worked, have the criteria, and thus the RF# reduced? If so, is the new RF# acceptable? If not, then perform another mitigation.

Figure 17:
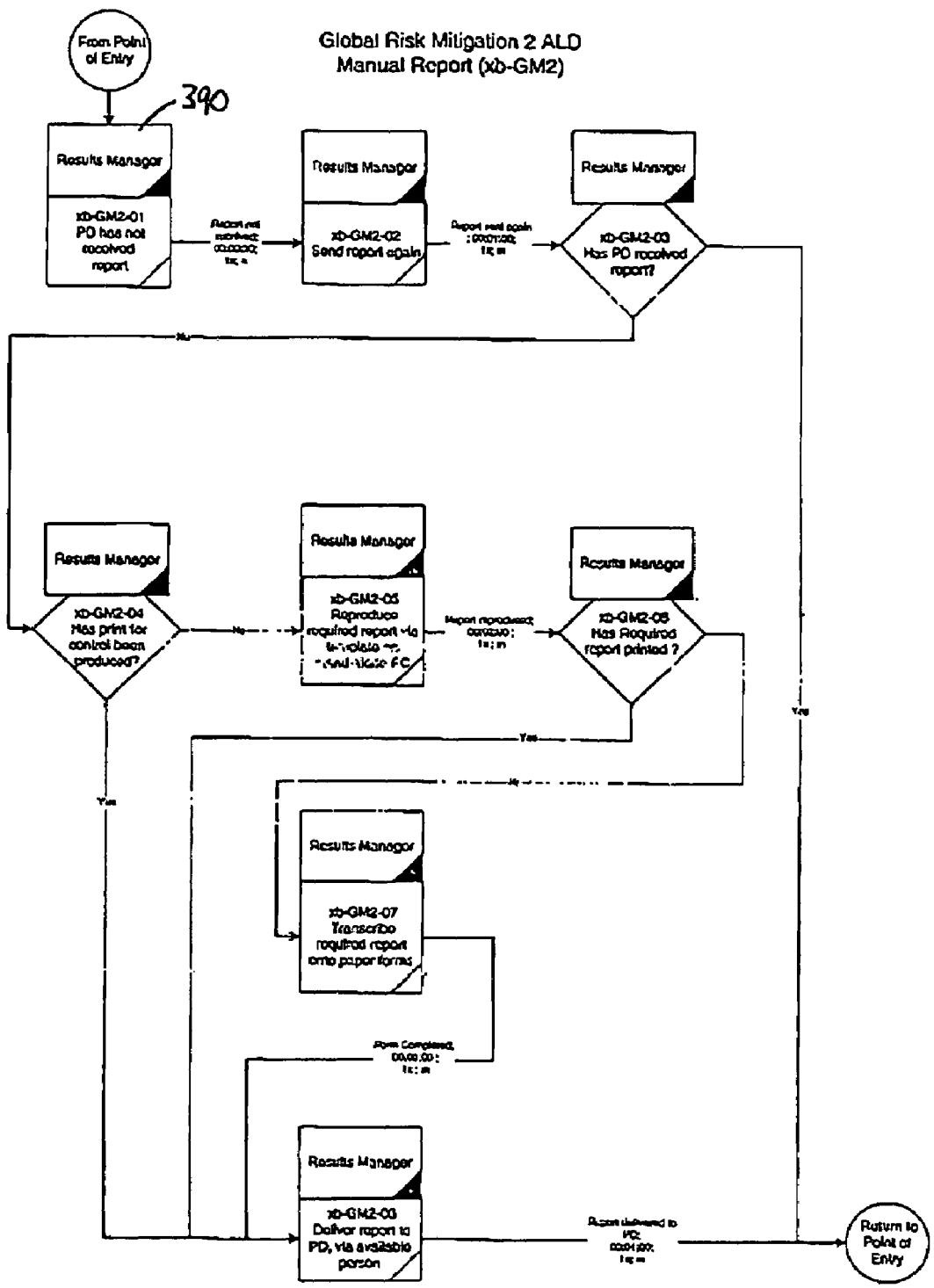
FIG. 17 shows a global risk mitigation ALD for the Manual Report scenario.
Figure 18:
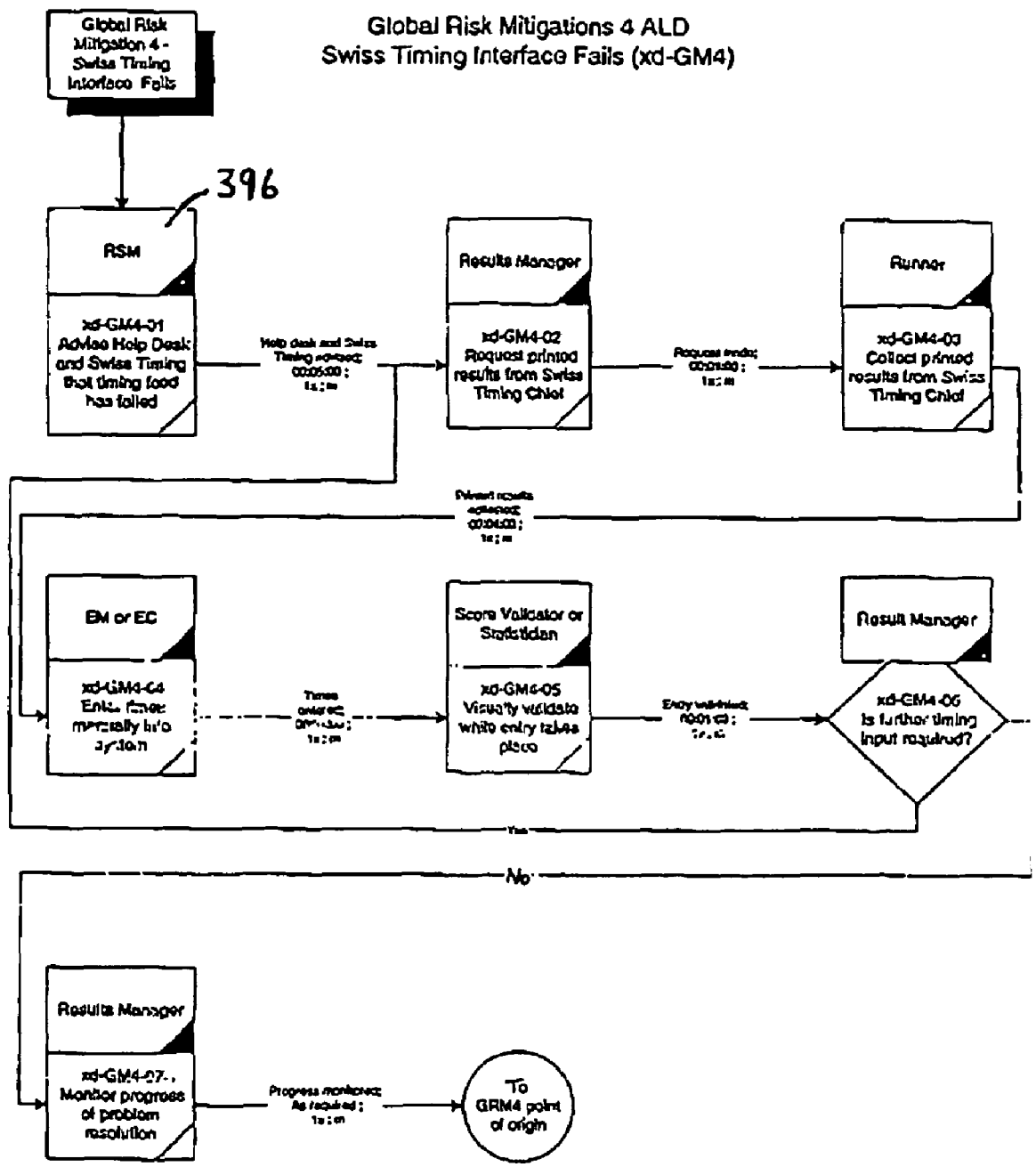
FIG. 18 shows a global risk mitigation ALD for the Swiss Timing Interface Feed fails scenario.

FIGS. 17 and 18 show alternate paths developed to mitigate an identified RF level that is too high. The mitigation strategies can be to devise one or more alternative paths, to reach a position of no unknown or undefined dependencies, or reduce recovery time.

For a process that has as an output the production of a report (e.g. process 384 in FIG. 14), a mitigation is to devise an alternative path, such as shown in FIG. 17. That is, the risk mitigation strategy is implemented at any time the Print Distribution Team has not received a report when such should have occurred (typically at the end of a match, end of a session, or end of a day). This is represented by sub-process no. 390. The sequential sub-processes are followed until the output of the report being delivered is satisfied.

For a process that has as a dependency a timing feed from a third party, (not specifically shown), one such mitigation is to devise an alternative path, such as shown in FIG. 18. This risk mitigation is implemented at any time that the Results System Manager (RSM) detects that the feed from Swiss Timing has failed, represented by sub-process no. 396.

B. OR100

This methodology is known as Operational Readiness 100, and refers to the principle that all build processes need to be completed such that there is operational readiness 100 days before commencement of the Olympic Games.

The underlying idea of OR100 is to determine what deliverables or service levels are required for each process to be operationally ready, and working backwards from that point to establish preceding processes, links and exit criteria. In other words, the program framework is constructed from "right-to-left".

Figure 19:
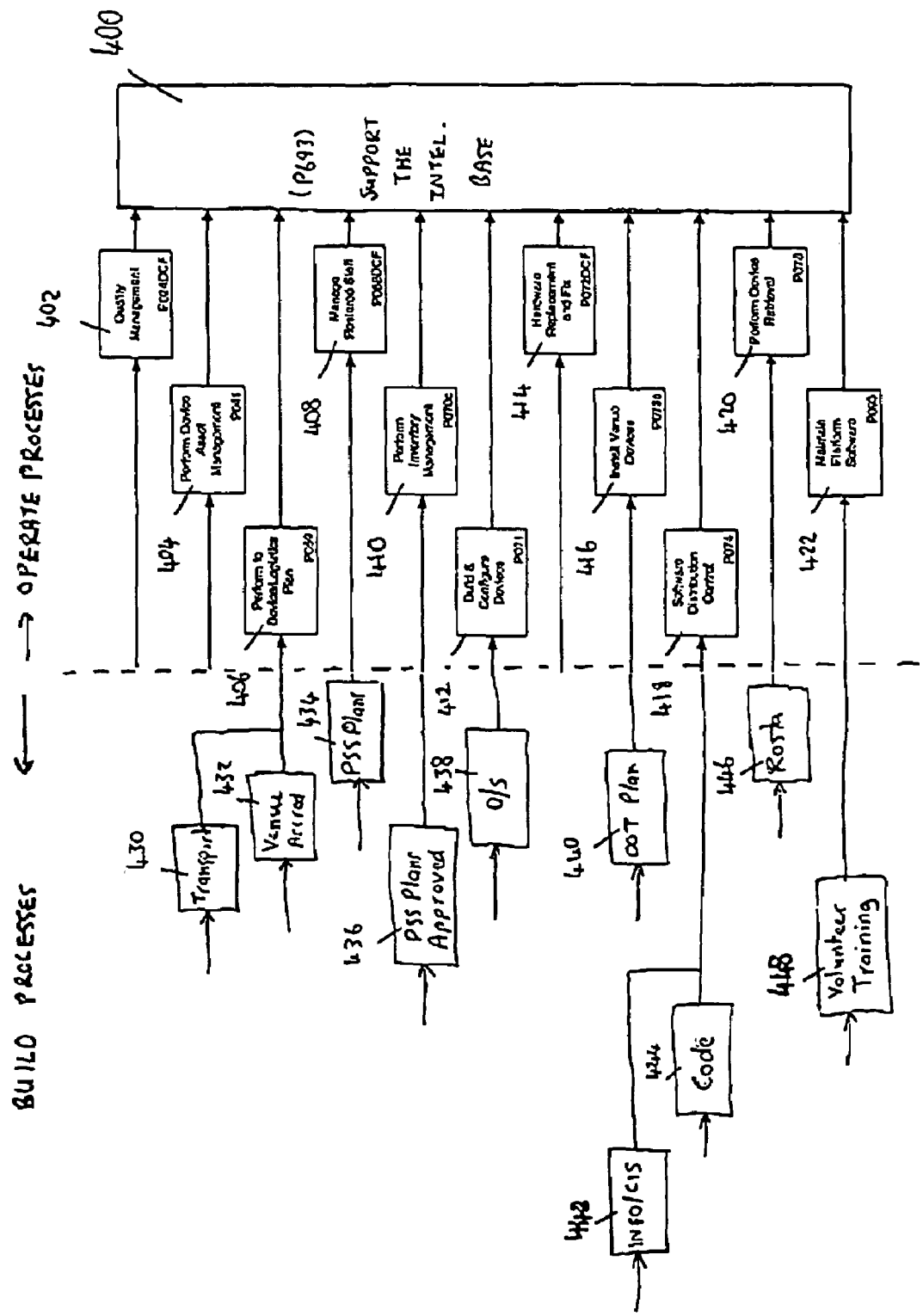
FIG. 19 shows a process framework produced by the OR100 methodology.

FIG. 19 represents a process framework culminating in the 'Support the INTEL™ Base'0 process 400, numbered P693. The outputs for P693 are to provide and support devices at the Technology Command Centre and other venues, configured for each one's specific use. Many of the outputs are services and for these, service level agreements would be prepared.

In order to achieve that level of operational readiness, the 'inputs' to process 693 are:

the provision of quality management management of the inventory of devices set up of Device Configuration Facility management of staff on a day-to-day basis ensure adequate supply of parts perform build of devices ensure replacement or fixing of failed devices unpack and install devices at venue install 'Golden Code' on devices retrieve devices after Test Events or completion of Games maintain platform software Having determined these 'inputs' dictates corresponding processes be defined, identified in FIG. 19, by the reference numerals 402-422.

The exit criteria for each of these processes are then determined, and are as follows:

P024DCF: *QA CHECKS: Performed QA checks as documented in P3 during build phase. *M47 PASS: Passed milestone checks. *CHANGE CONTROL: Installed devices are under change control P041: *INVENTORY SYSTEM: System in place showing location and status of all IBM devices. *COMPETENT STAFF: Staff to operate the system have been using the system for 6 months.

P059: *DOCUMENTED PLAN: The plan for deployment shows location of all Games time devices. *DEPLOYMENT PLAN: Delivery of all devices required for TR 1 accomplished.

P068DCF: *STAFF ROSTERS COMPLETE and stall members informed on their place and time of duty. *STANDBY LISTS COMPLETE, including telephone numbers and times of availability. *TRANSPORT available for standby staff. *WORKFORCE DATABASE complete and available. *POLICIES in place covering working hours, sick leave, etc. *STAFF AND VOLUNTEERS TRAINED and passed competency test.

P070C: *AUDIT TRAIL: Documented audit trail of devices installed available. *PARTS DEPLOYMENT DETAILS: Parts deployed according to PSS plan.

P071: *DOCUMENTED BUILD PLAN: Documented build plan in place and available for review. *STAFF: Staff identified to match build plan. *DEPLOYED SERVERS: Servers in place for deployment of software.

P072DCF: *Documented procedures for fix vs replacement.

P073c: *VISIBLE INSTALLED DEVICES: Installed devices visible at TCC. *DEVICE CHECK: Devices provided up and passed installation check. *DEPLOYMENT PLAN: Deployment plan documented for install teams.

P074: *TIVOLI CODE: Code available on Tivoli servers. *DOCUMENTED PLAN: Documented plan for software deployment.

P078: *DOCUMENTED PLAN: Documented bump-out plan available for review. *STAFF SCHEDULE: Staff schedule to perform device retrieval documented.

P093: *CID SERVERS: CID servers deployed. *STAFF: Competent staff to carry out deployment have exercised the build for 6 months. *VOLUNTEERS: Volunteers with third year attributes.

The process framework continues to be developed from right-to-left, in the sense that 'inputs' to each of the processes 402-422 are determined.

The following inputs are then defined:

P059: *Venue accreditation for transport drivers. *Adequate transport capability. *Venue access restricted.

P068DCF: *Plans for PSS approved

P07c: *PSS plan based on device MTBF.

P071: *Complete BoMs from VITMs. *BOMs reviewed for QA. *Operating system software frozen. *Base subsystem components available.

P073c: *DOT plan. *Availability of volunteers. *Volunteers not present when rostered.

P074 *Definition of approved code. *Person authorised to provide code approval. *INFO and CIS not frozen.

P078: *Volunteer attendance when required.

P093: *Training of volunteers. *Platform software supported by specialists and handed over to DCF.

This, in turn, dictates earlier processes, shown as process 430-448.

The methodology continues until at ultimate inputs are defined, thus completing the framework in terms of processes, links, and exit criteria.

C. SIPOC™

This methodology is known per se, and is termed "Suppliers, Inputs, Process, Outputs, Customers (SIPOC™).

Figure 20:
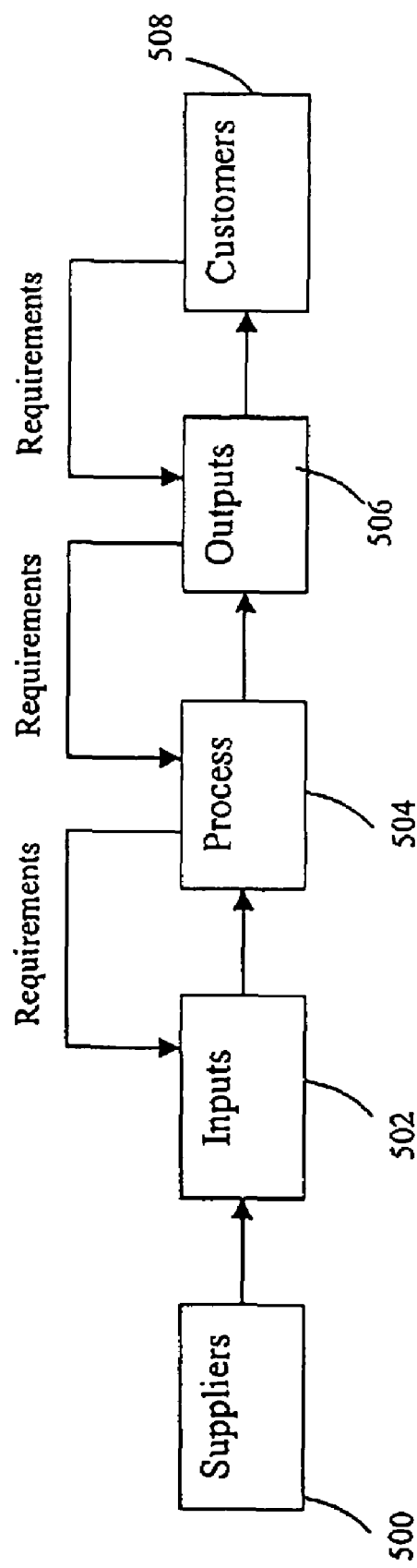
FIG. 20 shows a process block diagram for the SIPOC methodology.

The methodology identifies discrete actors, in the form, working from right to left of FIG. 20, of customers 508 having specific requirements and receiving outputs 506 in response thereto. In turn, the outputs specify requirements to, and receive from the process 504. Furthermore the process requirements are specified to the inputs 502 which also feeds the process 504. Finally, suppliers 500 provide specified goods and/or services to the inputs 502.

By adopting such a model it is possible to define inputs and outputs for individual processes. SIPOC™ thus is underpinned by the need to determine what products and/or services are to be delivered.

The Daily Progress Reporting process (P155) is one example for which SIPOC™ is implemented. The objectives of this process is to keep its customers informed at the end of each day of the operation of technology supporting the Olympic Games (ie. operations phase). Following the SIPOC™ methodology, the following processes are established.

TABLE 8

| Suppliers | Inputs | Process | Outputs | Customers |
|---|---|---|---|---|
| Process Owner Venue Data Sources-various Process Owner via Notes Administrator " " | Input Criteria Sheet Venus Information Items that match the Input Criteria Daily Report Input Form (Notes Stationery Item) Reporting Deadlines Contact & Distribution List | Source Author Input - normal operation Source Author Input - contingency (to be defined), will involve fax, email by mobile phone, verbal by telephone | Completed Daily Report Input Form (form will specify any metrics that have to be submitted) | Captain - using generic Notes ID Archive Database - using generic Notes ID |
| Process Owner Source Author Process Owner via Notes Administrator " " | Input Criteria Sheet Completed Daily Report Input Form Input Form - Captain's version Reporting Deadlines Contact & Distribution List | Captain's Brief - normal operation Captains Brief - contingency, to be defined, as above | Completed Captain's Briefs, by email (for each Information Area × 6) note - the Technology Captain's Report will contain a large number of metrics | Information Officer - using generic Notes ID Archive Database - using generate Noted ID |
| Information Officer - Metrics Information Captains | Lotus 123 Metrics Spreadsheets Captain's Brief, containing the required metrics | Prepare Daily Report Metrics | Updated 123 Spreadsheets in database Graphics derived from 123 Spreadsheet | Information Officers |
| Process Owner Captain Process Owner via Notes Administrator " Information Officer - Metrics | Input Criteria Sheet Captain's Brief Final Daily Report Form Reporting Deadlines Contact & Distribution List Daily Report Metrics &Graphics | Produce &Publish Daily Report (load in database and mark as "Private") Print hard copy and hand carry to IBM Games Exec for approval Approval by IBM Games (Approval) Exec Direct Distribute Hard Copy Reports to nominated recipients Mark approved report as "Public" in database Produce Daily Report - contingency, to be defined | Non-confidential Report Confidential Report Olympic Client Summary Report (distribution to be defined) 3 × reports approved Hard Copy Reports | Reports Database - Staff Reports Database - Management (database subject to regular backup by operations) (no database replication planned at this stage) Nominated IBM (Audience) Execs Other IBM (Audience) Executives and their staffs |
| Process Owner | Information Sources Reporting | Maintain Report Formats &Input | Report Formats (as Notes Stationery | Authors Captains |

TABLE 8-continued

| Suppliers | Inputs | Process | Outputs | Customers |
|---|---|---|---|---|
| | Requirements of Report Recipients Management Team &Marketing views of Information Sensitivity | Criteria | Items) Author Input Captain's Brief DPR Input Criteria Author Input Captain's Brief DPR | Information Officers " " " |
| Process Owner | Participant & End-user Communication & Training Needs | DPR Communication &Training | Communication Materials and Events aimed at IBM Management Training Materials and Training Delivered to participants as per agreed training needs (the end product of this activity is trained process participants and execs who understand how to access reports) | IBM (Audience) Executives and their staffs Process Participants |
| Process Owner | Notes Administrator Requirements for Database, Mail Groups, user access etc Help Desk Number and Escalation Charts | Notes Administration &Support | Operational Notes Databases, with Access Control Lists, Input Forms etc Report Distribution &Mailing Lists End User Support | Process Participants IBM (Audience) Executives and their staffs |
| Process Owner VITM | Infrastructure Requirements Statement Changes to Venue Bill of Materials or Layout | Infrastructure Capacity Management, Operations & Support | DPR Infrastructure Implementation Plan Operation DPR Notes Infrastructure & Environment Updated Venue Bill of Materials | Operations Sub-Project |

As a further step, an analysis of critical customer requirements can be performed, with reference to Inputs, Process and Outputs, such that a description of the requirement can be made, a target/measure ascribed, and an impact accessed in that is not met.

Furthermore, all inter-process dependencies can be defined in terms of the related process's identity, a description of the dependency, a timing or trigger, and a frequency or volume.

Finally, milestones are allocated in terms of a "date required". For the present example, these includes:

TABLE 9

| Item | Responsibility for Action | Date Required |
|---|---|---|
| Infrastructure Requirements Specification &Implementation Plan | (person) | (date) |
| Identify and finalise changes to Venue Equipment &Facilities | (person) | (date) |
| Agree/finalise source data input criteria and report formats | (person) | (date) |
| Prepare Metric spreadsheets and graphic output formats | (person) | (date) |
| Finalise reporting deadlines and distribution lists | (person) | (date) |
| Notes Administration &Support capability in place | (person) | (date) |
| Databases and Email Ids created | (person) | (date) |
| Performance testing complete | (person) | (date) |
| Process Test &Training complete | (person) | (date) |
| Staffing Plan for Cluster Test Event | (person) | (date) |

TABLE 9-continued

| Item | Responsibility for Action | Date Required |
|---|---|---|
| Final training for Cluster Test Event | (person) | (date) |
| Cluster Test Event-DPR in production | (person) | (date) |
| Debrief, lessons learned and process improvement plan | (person) | (date) |

D. Manual

This methodology refers only to the need for there to be a protocol or document setting out process inputs, outputs, any exit criteria, and dependencies.

Referring again to FIG. 8, the processes being ascribed the relevant criticality categories (ie. A, B, and C) have been indicated. Typically, category D is applied to certain management processes.

Event Planning Milestones & Dependencies

Once the program framework has been established, it is traversed to execute the program. An essential function of program management is Schedule Control. When all outputs have been defined, process owners are required to translate process outputs into a time schedule. In this way time dependencies of the completion of each process can be identified. The use of task activity charts, and the like, is well known, however, the present invention takes the approach of identifying a subset of all task activities (specifically those that equate to the output of each process) and allocating milestones to process outputs that cut-across defined process streams. For Schedule control within a project, an activity in the project Schedule is only completed when it satisfies the pre-defined exit criteria. For Schedule control across projects, milestones are used. Milestones are groups of outputs produced by a Project Team, that are inputs to processers owned by other Project Teams. Milestones then represent the key dependencies between Project Teams, and are the primary Schedule control tool at a program level.

Consider again FIG. 8, which identifies the following process streams:
(i) Workforce/training
(ii) Process
(iii) Testing/SW Control & Distribution
(iv) Venues/Infrastructure/Device Configuration & Logistics/Operations
(v) Application Development Process streams are a string of processes typically assigned to a single Project Team. Where there is a link spanning one or more process streams, a milestone is defined to represent a dependency between Project Teams. FIG. 8 shows such milestones, indicated as Mn.

The activities and milestones can be entered into a suitable scheduling tool, such as the Primavera Project Planner where there are assigned start and end dates and owners. On complex programs, the scheduling tool needs to be able to produce multiple views of activities and milestones. For Project Managers it needs to conveniently list the outputs (e.g. deliverables or services) and the resources required to produce them. For Program Managers the tool needs to list the milestones each project team is responsible for, together with the associated deliverables.

There is considerable advantage to forming a connection between significant process outputs and milestones in time. Firstly, attaching deliverables to milestones removes any ambiguity regarding whether a milestone has been achieved. Second, it identifies major cross-team dependencies, which will have a major cross-team impact in the event of schedule slippage. Additionally, being at a higher level than tasks/activities, it is easier for Program Managers to conduct a meaningful review of progress without having to become involved in the inner workings of individual project teams.

Although the invention has been described with reference to a large-scale sporting event (via, the Olympic Games), it is to be appreciated that it is equally applicable to any other field of endeavour. This can include the burgeoning field of e-business as much as more traditional manufacturing and construction enterprises.

The foregoing describes only a few embodiments of the invention, and modifications and/or changes can be made thereto without departing from the scope and spirit of the invention, the embodiments being illustrative and not restrictive.

We claim:

1. A system for building and operating infrastructure for an event, comprising:
    information technology for a build and operate program, wherein the information technology includes computer systems or telecommunications equipment, the computer systems or telecommunications equipment including software embodied in computer-readable media and including hardware, and wherein the program includes:
        one or more build processes;
        one or more operate processes; and
        one or more management processes; and
    wherein the information technology includes data embodied in computer-readable media representing i) inputs and outputs for ones of said processes and ii) a plurality of links associated with respective ones of the inputs and outputs, wherein the links provide connections linking outputs from ones of said build, operate and management processes to inputs of respective other ones of the build, operate or management processes, wherein the data representing the linked process inputs and outputs provides a schedule of the processes for building and operating infrastructure for the event;
    wherein such a link has exit conditions embodied in computer-readable media of the information technology data and associated with the link, and the exit conditions for the link must be satisfied before the link can be traversed from output to input;
    wherein selected sets of sequentially-linked ones of the processes are assigned to selected project teams and the sets are designated as respective process streams embodied in computer-readable media of the information technology data, so that the teams are associated with the schedule of the build and operate processes;
    wherein planning milestones embodied in computer-readable media of the information technology data are designated for ones of the outputs having links spanning across two or more of the process streams, so that dependencies among teams having an impact on the schedule are identified; and
    wherein, to identify schedule risk, risk factors embodied in computer-readable media of the information technology data are assigned to the processes and the system generates a list of the processes for each team's process stream.

2. The system of claim 1, wherein said build processes precede said operate processes, with an overlapping boundary therebetween, such that some operate processes are able to be executed before all build processes are executed.

3. The system of claim 1, wherein each management process is linked only to either a build process or an operate process.

4. The system of claim 1, wherein said exit conditions represent deliverable products or services that have been agreed to be provided.

5. A system for building and operating infrastructure for a large-scale sporting event, comprising:
    information technology for the event, wherein the information technology includes computer systems or telecommunications equipment, the computer systems or telecommunications equipment including software embodied in computer-readable media and including hardware, and wherein the event includes:
        a set of build processes generally followed by a set of testing processes, generally followed by a set of operations processes, generally followed by a set of game-day processes;
        a set of management processes related to all of said build, testing, operations, and game-day sets of processes; and
    wherein the information technology includes data embodied in computer-readable media representing i) inputs and outputs for ones of said processes and ii) a plurality of links, wherein the links provide connections linking outputs from ones of said build, test, operate, game-day, and management processes to inputs of respective other ones of the build, test, operate, game-day, and management processes;

wherein such a link has exit conditions embodied in computer-readable media of the information technology data and associated with the link, and the exit conditions for the link must be satisfied before the link can be traversed from output to input;

wherein sets of selected, sequentially-linked ones of the processes are assigned to selected project teams, and the sets are designated as respective process streams embodied in computer-readable media of the information technology data, so that dependencies among the teams are identified for a schedule of processes for building and operating infrastructure for the event;

wherein planning milestones embodied in computer-readable media of the information technology data are designated for ones of the outputs having links spanning across two or more of the process streams, so that dependencies among teams having an impact on the schedule are identified; and wherein, to identify schedule risk, risk factors embodied in computer-readable media of the information technology data are assigned to the processes and the system generates a list of the processes for each team's process stream.

6. The system of claim 5, wherein each management process is linked only to either a build process or an operate process.

7. The system of claim 5, wherein said exit conditions represent deliverable products or service levels that have been agreed to be provided.

8. A method for building and operating infrastructure for an event, the method comprising the steps of:

defining, in data embodied in computer-readable media of information technology, one or more build processes, one or more operate processes and one or more management processes, wherein the information technology includes computer systems or telecommunications equipment, the computer systems or telecommunications equipment including software embodied in computer-readable media and including hardware, and wherein data for the build, operate and management processes in the information technology include respective inputs and outputs embodied in computer-readable media;

forming a plurality of links associated with respective ones of the data inputs and outputs, wherein the links provide connections linking the outputs from ones of said build, operate, and management processes to the inputs of respective other ones of the build, operate, or management processes;

associating, with the respective links, exit conditions embodied in computer-readable media in the information technology data, wherein the exit condition for a respective one of the links must be satisfied before the link can be traversed from output to input;

assigning selected sets of sequentially-linked ones of the processes to selected project teams and designating the sets as respective process streams embodied in computer-readable media in the information technology data, so that dependencies among the teams are identified for a schedule of processes for building and operating infrastructure for the event;

designating planning milestones embodied in computer-readable media in the information technology data for ones of the outputs having links spanning across two or more of the process streams, so that dependencies among teams having an impact on the schedule are identified;

assigning to the processes risk factors embodied in computer-readable media of the information technology data; and generating, by the system, a list of the processes for each team's process stream, wherein the risk factors and the list identify schedule risk.

9. The method of claim 8, wherein said build processes precede said operate processes, with an overlapping boundary therebetween such that some operate processes are able to be executed before all build processes are executed.

10. The method of claim 9, wherein each management process is linked only to either a build process or an operate process.

11. The method of claim 8, wherein said exit conditions represent deliverable products or service levels that have been agreed to be provided.

12. The method of claim 8, wherein the method includes:

executing the processes, including traversing said links over time.

13. The method of claim 12, wherein said requirements include deliverable products and service levels.

14. A method for building and operating infrastructure for an event, comprising the steps of:

defining, in data embodied in computer-readable media of information technology, a set of build processes followed by a set of testing processes, followed by a set of operations processes, and followed by a set of game-day processes, wherein the information technology includes computer systems or telecommunications equipment, the computer systems or telecommunications equipment including both hardware and software;

defining, in data embodied in computer-readable media of the information technology, a set of management processes related to all of said build, testing, operations, and game-day processes, wherein data embodied in computer-readable media of the information technology for the build, testing, operations, management and game-day processes have respective inputs and outputs;

forming a plurality of links associated with respective ones of the data inputs and outputs, wherein the links provide connections linking outputs from ones of said build, test, operate, game-day, and management processes to the inputs of respective other ones of the build, test, operate, game-day, and management processes; and associating, with the respective links, exit conditions in data embodied in computer-readable media of the information technology, wherein the exit condition for a respective one of the links must be satisfied before the link can be traversed from output to input;

assigning selected sets of sequentially-linked ones of the processes to selected project teams and designating the sets as respective process streams in data embodied in computer-readable media of the information technology data, so that dependencies among the teams are identified for a schedule of processes for building and operating infrastructure for the event;

designating planning milestones embodied in computer-readable media in the information technology data, wherein the milestones are for ones of the outputs having links spanning across two or more of the process streams, so that dependencies among teams having an impact on the schedule are identified;

assigning to the processes risk factors embodied in computer-readable media of the information technology data; and generating, by the system, a list of the processes for each team's process stream, wherein the risk factors and the list identify schedule risk.

15. The method of claim 14, wherein the method includes:
executing the processes, including traversing said links over time.

16. The method of claim 15, wherein said requirements include deliverable products and service levels.

* * * * *